United States Patent
Anegawa et al.

(10) Patent No.: US 12,162,210 B2
(45) Date of Patent: *Dec. 10, 2024

(54) THREE-DIMENSIONAL SHAPING DEVICE AND METHOD FOR MANUFACTURING THREE-DIMENSIONAL SHAPED OBJECT

(71) Applicant: Seiko Epson Corporation, Tokyo (JP)

(72) Inventors: Kenta Anegawa, Matsumoto (JP); Riona Hayashi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,085

(22) Filed: Jul. 27, 2021

(65) Prior Publication Data
US 2022/0032536 A1    Feb. 3, 2022

(30) Foreign Application Priority Data
Jul. 28, 2020  (JP) .................................. 2020-127035

(51) Int. Cl.
*B29C 64/118*    (2017.01)
*B29C 64/209*    (2017.01)
(Continued)

(52) U.S. Cl.
CPC .......... *B29C 64/118* (2017.08); *B29C 64/209* (2017.08); *B29C 64/232* (2017.08);
(Continued)

(58) Field of Classification Search
None
See application file for complete search history.

(56) References Cited

U.S. PATENT DOCUMENTS

| 2,871,516 | A | 2/1959 | Sherman et al. |
| 4,107,246 | A | 8/1978 | LaSpisa |

(Continued)

FOREIGN PATENT DOCUMENTS

| CN | 103878979 A | 6/2014 |
| CN | 104290325 A | 1/2015 |

(Continued)

*Primary Examiner* — Armand Melendez
(74) *Attorney, Agent, or Firm* — Harness, Dickey & Pierce, P.L.C.

(57) ABSTRACT

A variation in a deposition amount per unit area of a plasticized material discharged from each nozzle and deposited on a stage due to a variation in a discharge amount of the plasticized material discharged from each nozzle is reduced. A three-dimensional shaping device includes: a plasticizing unit configured to generate a plasticized material by rotation of a screw; a discharge unit configured to discharge the plasticized material from a plurality of nozzles; a discharge amount adjustment unit configured to adjust a discharge amount of the plasticized material from each of the plurality of nozzles; a moving unit configured to relatively move the discharge unit with respect to a stage; and a control unit. The control unit executes, based on a discharge state of the plasticized material from the plurality of nozzles, at least one of a first control of controlling a rotation speed of the screw, a second control of controlling the discharge amount by the discharge amount adjustment unit, and a third control of controlling a relative speed of the discharge unit with respect to the stage, so as to laminate a shaping layer formed of the plasticized material on the stage.

12 Claims, 12 Drawing Sheets

(51) Int. Cl.
  *B29C 64/232* (2017.01)
  *B29C 64/236* (2017.01)
  *B29C 64/245* (2017.01)
  *B29C 64/314* (2017.01)
  *B29C 64/343* (2017.01)
  *B29C 64/393* (2017.01)
  *B33Y 10/00* (2015.01)
  *B33Y 30/00* (2015.01)
  *B33Y 50/02* (2015.01)

(52) U.S. Cl.
  CPC .......... *B29C 64/236* (2017.08); *B29C 64/245* (2017.08); *B29C 64/314* (2017.08); *B29C 64/343* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 4,721,589 A | 1/1988 | Harris |
| 5,121,329 A | 6/1992 | Crump |
| 5,260,009 A | 11/1993 | Penn |
| 5,303,141 A | 4/1994 | Batchelder et al. |
| 5,340,433 A | 8/1994 | Crump |
| 5,402,351 A | 3/1995 | Batchelder et al. |
| 5,633,021 A | 5/1997 | Brown et al. |
| 5,747,077 A | 5/1998 | Yoshida et al. |
| 6,019,916 A | 2/2000 | Mizuguchi et al. |
| 6,401,001 B1 | 6/2002 | Jang et al. |
| 6,578,596 B1 | 6/2003 | Batchelder et al. |
| 7,874,825 B2 | 1/2011 | Khoshnevis |
| 10,254,499 B1 | 4/2019 | Cohen et al. |
| 10,981,332 B2 | 4/2021 | Chanclon et al. |
| 11,034,087 B2 | 6/2021 | Saito et al. |
| 11,077,619 B2 | 8/2021 | Yuwaki et al. |
| 11,161,297 B2 | 11/2021 | Tyler et al. |
| 11,413,809 B2 * | 8/2022 | Hashimoto ........... B29C 64/321 |
| 11,446,865 B2 | 9/2022 | Streicher et al. |
| 2005/0015171 A1 | 1/2005 | Cruz-Uribe et al. |
| 2005/0015175 A1 | 1/2005 | Huang |
| 2007/0138678 A1 | 6/2007 | Khoshnevis |
| 2013/0141491 A1 | 6/2013 | Krichtman et al. |
| 2014/0252668 A1 | 9/2014 | Austin et al. |
| 2016/0046073 A1 | 2/2016 | Hadas |
| 2016/0082653 A1 | 3/2016 | Ohnishi |
| 2017/0008230 A1 | 1/2017 | Yuyama |
| 2017/0157820 A1 | 6/2017 | Ward et al. |
| 2017/0157831 A1 * | 6/2017 | Mandel ................. B29C 64/106 |
| 2017/0157844 A1 | 6/2017 | Mandel et al. |
| 2017/0203506 A1 | 7/2017 | Hjelsand et al. |
| 2017/0203507 A1 | 7/2017 | Leavitt et al. |
| 2017/0210069 A1 | 7/2017 | Stubenruss |
| 2017/0210074 A1 | 7/2017 | Ueda et al. |
| 2017/0232681 A1 | 8/2017 | Xu et al. |
| 2017/0291364 A1 | 10/2017 | Womer |
| 2017/0297107 A1 | 10/2017 | Oka et al. |
| 2018/0169941 A1 | 6/2018 | Taniguchi et al. |
| 2018/0200955 A1 | 7/2018 | Hoelldorfer et al. |
| 2018/0311894 A1 * | 11/2018 | Saito ...................... B33Y 30/00 |
| 2018/0326657 A1 | 11/2018 | Iwase |
| 2018/0348247 A1 | 12/2018 | Ando |
| 2019/0022934 A1 | 1/2019 | Kobe et al. |
| 2019/0022940 A1 | 1/2019 | Hofmann et al. |
| 2019/0030811 A1 | 1/2019 | Gasso et al. |
| 2019/0030820 A1 | 1/2019 | Saito et al. |
| 2019/0061243 A1 | 2/2019 | Saito et al. |
| 2019/0076924 A1 | 3/2019 | Jepeal et al. |
| 2019/0168446 A1 | 6/2019 | Leibig et al. |
| 2019/0217546 A1 | 7/2019 | Bosveld et al. |
| 2019/0315114 A1 | 10/2019 | Hjelsand et al. |
| 2019/0375003 A1 | 12/2019 | Mark |
| 2020/0016833 A1 | 1/2020 | Yuwaki et al. |
| 2020/0016834 A1 | 1/2020 | Yuwaki et al. |
| 2020/0094479 A1 | 3/2020 | Yamasaki et al. |
| 2020/0094480 A1 | 3/2020 | Yamasaki |
| 2020/0164575 A1 | 5/2020 | Yuwaki et al. |
| 2020/0198240 A1 | 6/2020 | Hashimoto et al. |
| 2020/0207017 A1 | 7/2020 | Yuwaki et al. |
| 2020/0230942 A1 | 7/2020 | Gasso et al. |
| 2020/0269515 A1 | 8/2020 | Takahashi |
| 2020/0406548 A1 | 12/2020 | Yuwaki et al. |
| 2021/0039306 A1 | 2/2021 | Busbee |
| 2021/0154910 A1 * | 5/2021 | Cheng .................. B29C 64/232 |
| 2021/0162663 A1 | 6/2021 | Saito et al. |
| 2021/0206065 A1 | 7/2021 | Saito et al. |
| 2021/0387410 A1 | 12/2021 | Moore et al. |
| 2021/0402687 A1 | 12/2021 | Anegawa et al. |
| 2022/0032536 A1 | 2/2022 | Anegawa et al. |
| 2022/0118524 A1 | 4/2022 | Nakamura et al. |
| 2022/0134438 A1 | 5/2022 | Yamazaki |
| 2022/0234280 A1 * | 7/2022 | Hashimoto ........... B29C 64/343 |

FOREIGN PATENT DOCUMENTS

| | | |
|---|---|---|
| CN | 204622625 U | 9/2015 |
| CN | 105172143 A | 12/2015 |
| CN | 105291442 A | 2/2016 |
| CN | 106573405 A | 4/2017 |
| CN | 106853683 A | 6/2017 |
| CN | 107336435 A | 11/2017 |
| CN | 108790155 A | 11/2018 |
| CN | 109421269 A | 3/2019 |
| CN | 109605745 A | 4/2019 |
| EP | 3437837 A1 | 2/2019 |
| JP | H03-158228 A | 7/1991 |
| JP | H05-345359 A | 12/1993 |
| JP | H06-179243 A | 6/1994 |
| JP | H07-096534 A | 4/1995 |
| JP | H11-042712 A | 2/1999 |
| JP | 2000-246780 A | 9/2000 |
| JP | 2005-344765 A | 12/2005 |
| JP | 2006-192710 A | 7/2006 |
| JP | 2010-241016 A | 10/2010 |
| JP | 2012-131115 A | 7/2012 |
| JP | 2015-502870 A | 1/2015 |
| JP | 2015-148309 A | 8/2015 |
| JP | 2015-208879 A | 11/2015 |
| JP | 2016-064539 A | 4/2016 |
| JP | 2017-013351 A | 1/2017 |
| JP | 2017-035811 A | 2/2017 |
| JP | 2017-523934 A | 8/2017 |
| JP | 2017-528340 A | 9/2017 |
| JP | 2017-190505 A | 10/2017 |
| JP | 2017-213735 A | 12/2017 |
| JP | 2018-012221 A | 1/2018 |
| JP | 2018-066056 A | 4/2018 |
| JP | 2018-122454 A | 8/2018 |
| JP | 2018-187777 A | 11/2018 |
| JP | 2019-038157 A | 3/2019 |
| JP | 2019-064090 A | 4/2019 |
| JP | 2019-155691 A | 9/2019 |
| JP | 2020-023189 A | 2/2020 |
| JP | 2020-524092 A | 8/2020 |
| WO | 2015-129733 A1 | 9/2015 |
| WO | 2015-135434 A1 | 9/2015 |
| WO | 2015-182675 A1 | 12/2015 |
| WO | 2016-020150 A1 | 2/2016 |
| WO | 2016/185626 A1 | 11/2016 |
| WO | 2017-008789 A1 | 1/2017 |
| WO | 2017-038984 A1 | 3/2017 |
| WO | 2018-038751 A1 | 3/2018 |
| WO | 2018-210183 A1 | 11/2018 |

* cited by examiner

THREE-DIMENSIONAL SHAPING DEVICE AND METHOD FOR MANUFACTURING THREE-DIMENSIONAL SHAPED OBJECT

BACKGROUND

The present application is based on, and claims priority from JP Application Serial Number 2020-127035, filed Jul. 28, 2020, the disclosure of which is hereby incorporated by reference herein in its entirety

1. Technical Field

The present disclosure relates to a three-dimensional shaping device and a method for manufacturing a three-dimensional shaped object.

2. Related Art

JP-A-2006-192710 discloses a device that extrudes a thermoplastic material heated and melted by a preheater onto a base from an extrusion nozzle that performs scanning according to preset shape data, and laminates a molten material on the material cured on the base to produce a three-dimensional shaped object. WO 2016/185626 discloses a device that applies a pulse voltage to a heating plate to instantaneously heat the heating plate to melt a material in a flow path and generate thermal strain in a thin plate constituting a side wall of the flow path, and intermittently discharges the melted material from a plurality of discharge ports by using the thermal strain in the thin plate.

As in JP-A-2006-192710, when a three-dimensional shaped object is shaped in a one-stroke sketch manner using a device that discharges a material from one nozzle, shaping time is long. Therefore, as disclosed in WO 2016/185626, the shaping time can be shortened by using the device that discharges a material from a plurality of nozzles. When a three-dimensional shaped object is shaped by using the device that discharges a material from the plurality of nozzles, it is preferable to switch between a stop and a start of discharge of the material from each nozzle according to a shape of the three-dimensional shaped object. However, for example, in the device capable of simultaneously discharging a material pressure-fed from one material supply source from the plurality of nozzles, when the number of nozzles that stop discharging the material among the plurality of nozzles is changed, a discharge amount of the material from nozzles that do not stop discharging the material varies, and there is a possibility that the three-dimensional shaped object cannot be shaped with high dimensional accuracy.

SUMMARY

According to a first aspect of the present disclosure, a three-dimensional shaping device is provided. The three-dimensional shaping device includes: a plasticizing unit including a screw and configured to plasticize a material by rotation of the screw to generate a plasticized material; a stage having a deposition surface on which the plasticized material is deposited; a discharge unit having a plurality of nozzles disposed side by side along a first axis parallel to the deposition surface of the stage, and configured to discharge the plasticized material from the plurality of nozzles toward the deposition surface; a discharge amount adjustment unit configured to adjust a discharge amount of the plasticized material from each of the plurality of nozzles; a moving unit configured to relatively move the discharge unit with respect to the stage along a second axis that is parallel to the deposition surface of the stage and intersects the first axis; and a control unit. The control unit executes, based on a discharge state of the plasticized material from the plurality of nozzles, at least one of a first control of controlling a rotation speed of the screw, a second control of controlling the discharge amount by the discharge amount adjustment unit, and a third control of controlling a relative speed of the discharge unit with respect to the stage, so as to laminate a shaping layer formed of the plasticized material on the stage.

According to a second aspect of the present disclosure, a method for manufacturing a three-dimensional shaped object is provided. The method for manufacturing a three-dimensional shaped object is a method of discharging a plasticized material from a plurality of nozzles disposed side by side along a first axis toward a deposition surface parallel to the first axis, and laminating a shaping layer formed of the plasticized material on the deposition surface to manufacture a three-dimensional shaped object. The method includes: a first step of plasticizing a material by rotation of a screw to generate the plasticized material; a second step of adjusting a discharge amount of the plasticized material from each of the plurality of nozzles; and a third step of discharging the plasticized material from the plurality of nozzles toward the deposition surface while relatively moving the plurality of nozzles with respect to the deposition surface along a second axis parallel to the deposition surface and intersecting the first axis. At least one of a rotation speed of the screw in the first step, the discharge amount in the second step, and a relative speed of the plurality of nozzles with respect to the deposition surface in the third step is adjusted based on a discharge state of the plasticized material from the plurality of nozzles, and a shaping layer formed of the plasticized material is laminated on the deposition surface.

DESCRIPTION OF EXEMPLARY EMBODIMENTS

A. First Embodiment

Figure 1:
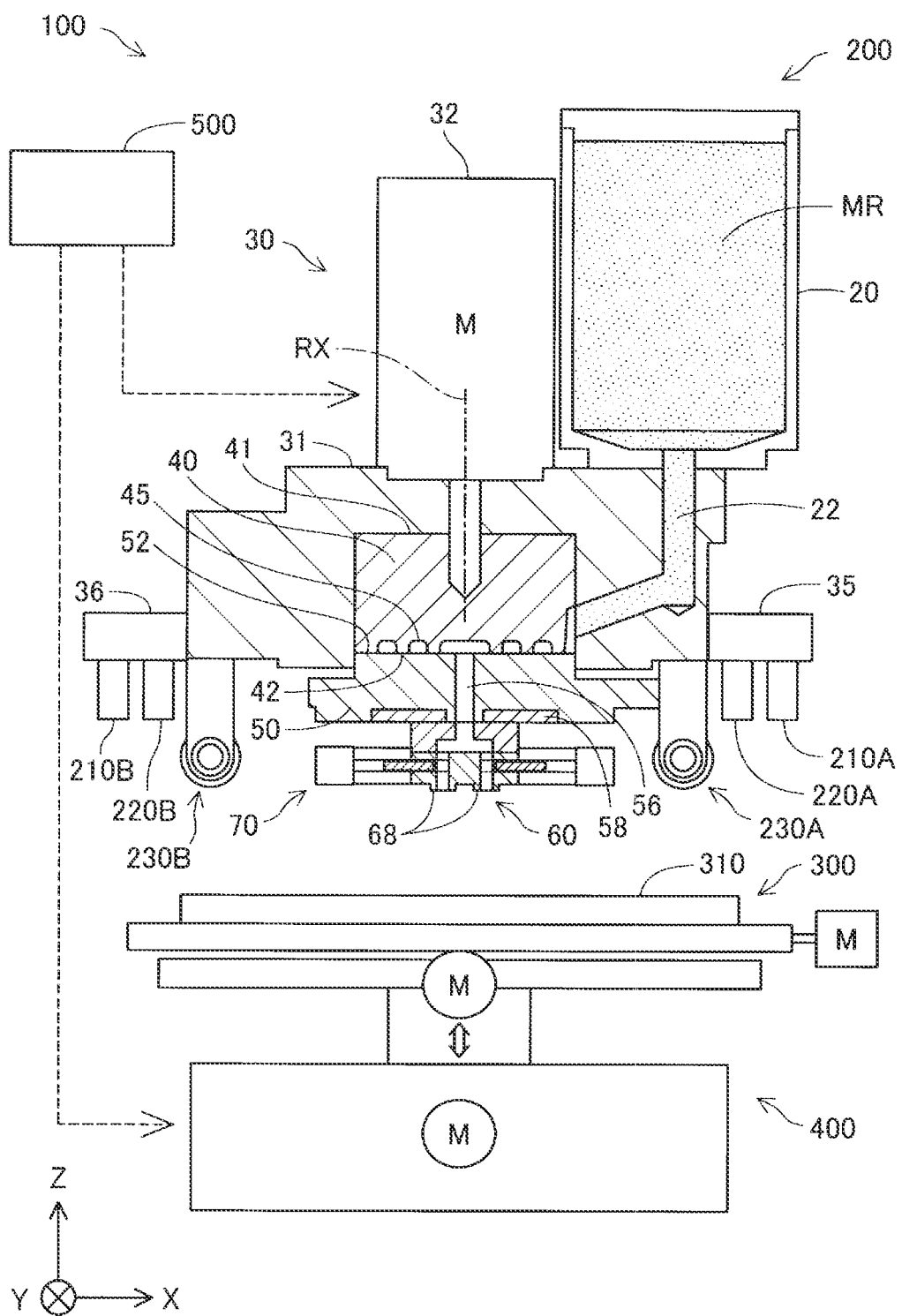
FIG. 1 is a cross-sectional view showing a schematic configuration of a three-dimensional shaping device according to a first embodiment.
Figure 2:
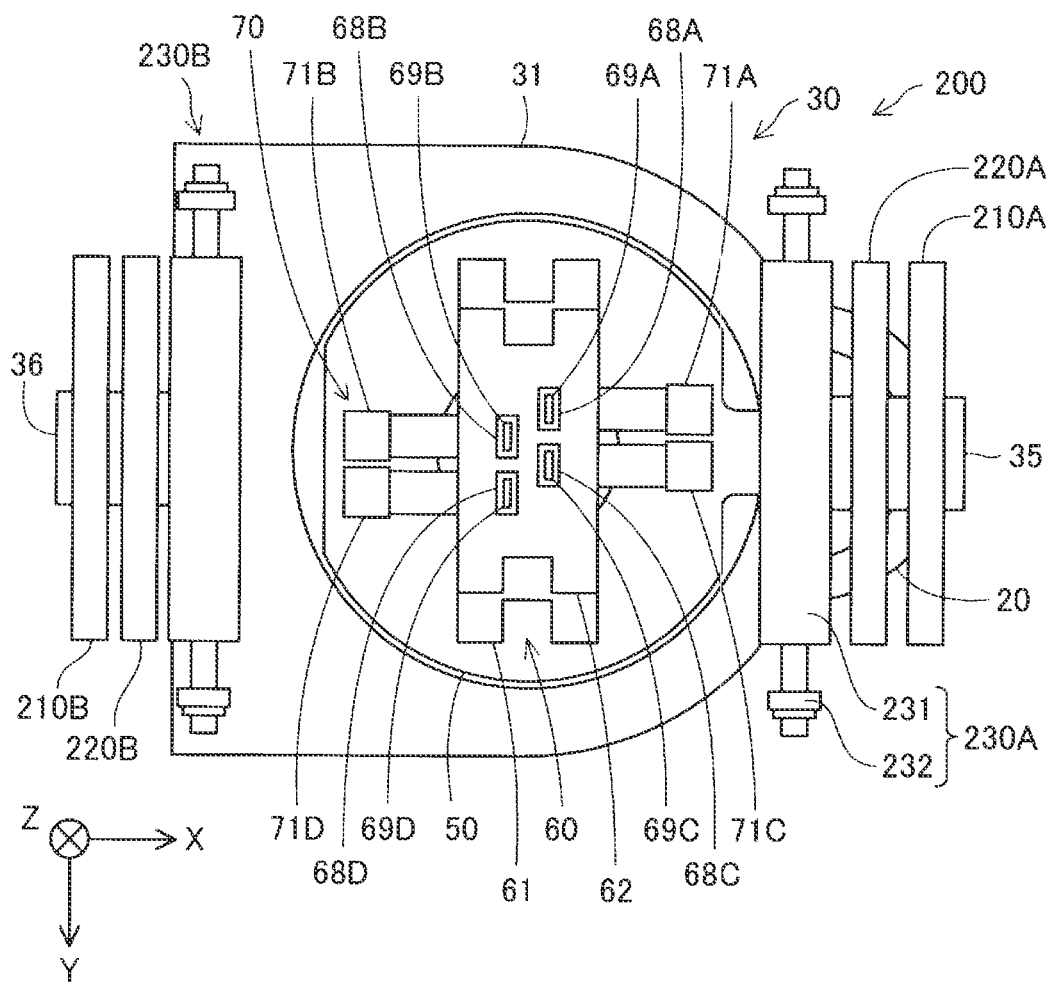
FIG. 2 is a bottom view showing a schematic configuration of a shaping unit according to the first embodiment.

FIG. 1 is a cross-sectional view showing a schematic configuration of a three-dimensional shaping device 100 according to a first embodiment. FIG. 2 is a bottom view showing a schematic configuration of a shaping unit 200 according to the present embodiment. FIGS. 1 and 2 show arrows representing X, Y, Z axes, which are three coordinate axes orthogonal to each other. The X axis and the Y axis are coordinate axes parallel to a horizontal plane, and the Z axis is a coordinate axis perpendicular to the horizontal plane. The arrows representing the X, Y, Z axes are also shown in other drawings as appropriate, so that directions indicated by the arrows correspond to those in FIGS. 1 and 2. The Y axis may be referred to as a first axis, the X axis may be referred to as a second axis, and the Z axis may be referred to as a third axis.

In the following description, a direction indicated by the arrow representing the X axis is referred to as a +X direction, a direction indicated by the arrow representing the Y axis is referred to as a +Y direction, and a direction indicated by the arrow representing the Z axis is referred to as a +Z direction. A direction opposite to the +X direction is referred to as a −X direction, a direction opposite to the +Y direction is referred to as a −Y direction, and a direction opposite to the +Z direction is referred to as a −Z direction. The −Z direction is a direction along a gravity direction. The +X direction and the −X direction are simply referred to as an X direction when the +X direction and the −X direction are described without being particularly distinguished from each other, the +Y direction and the −Y direction are simply referred to as a Y direction when the +Y direction and the −Y direction are described without being particularly distinguished from each other, and the +Z direction and the −Z direction are simply referred to as a Z direction when the +Z direction and the −Z direction are described without being particularly distinguished from each other.

As shown in FIG. 1, the three-dimensional shaping device 100 includes a shaping unit 200, a stage 300, a moving unit 400, and a control unit 500. The shaping unit 200 includes a discharge unit 60 that discharges a plasticized material. The stage 300 has a deposition surface 310 on which the plasticized material discharged from the discharge unit is deposited. The three-dimensional shaping device 100 discharges the plasticized material from the discharge unit 60 toward the deposition surface 310 of the stage 300 while relatively moving the discharge unit 60 and the stage 300 by using the moving unit 400, thereby laminating a shaping layer formed of the plasticized material on the deposition surface 310 and shaping a three-dimensional shaped object which is a laminated body of the shaping layer.

In the present embodiment, the shaping unit 200 includes a material supply unit 20, a plasticizing unit 30, the discharge unit 60, a discharge amount adjustment unit 70, a first surface activation unit 210A, a second surface activation unit 210B, a first heating and cooling unit 220A, a second heating and cooling unit 220B, a first flattening unit 230A, and a second flattening unit 230B.

The material supply unit 20 supplies a material MR to the plasticizing unit 30. As the material MR, for example, a thermoplastic resin such as an ABS resin can be used. In the present embodiment, an ABS resin formed into a pellet shape is used as the material MR. The material supply unit 20 includes a hopper that stores the material MR. A supply path 22 that couples the material supply unit 20 and the plasticizing unit 30 is provided below the material supply unit 20. The material MR stored in the material supply unit 20 is supplied to the plasticizing unit 30 via the supply path 22.

The plasticizing unit 30 plasticizes the material MR supplied from the material supply unit 20 to generate the plasticized material, and supplies the plasticized material to the discharge unit 60. A term "plasticize" means that heat is applied to a thermoplastic material to melt the material. A term "melt" means that not only the thermoplastic material is heated to a temperature equal to or higher than a melting point to become a liquid state, but also the thermoplastic material is heated to a temperature equal to or higher than a glass transition point to be softened, thereby exhibiting fluidity.

The plasticizing unit 30 includes a screw case 31, a drive motor 32, a flat screw 40, a barrel 50, and a heater 58. The screw case 31 is a housing that stores the flat screw 40. The barrel 50 is fixed to a lower end portion of the screw case 31. The flat screw 40 is stored in a space surrounded by the screw case 31 and the barrel 50.

The flat screw 40 has a substantially cylindrical shape of which a height in a direction along a central axis RX of the flat screw 40 is smaller than a diameter thereof. The flat screw 40 is disposed in the screw case 31 such that the central axis RX is parallel to the Z direction. An upper surface 41 side of the flat screw 40 is coupled to the drive motor 32 driven under a control of the control unit 500, and the flat screw 40 is rotated around the central axis RX in the screw case 31 by torque generated by the drive motor 32. The flat screw 40 has a groove forming surface 42 on which groove portions 45 are formed on a side opposite to the upper surface 41. The barrel 50 has a screw facing surface 52 that faces the groove forming surface 42 of the flat screw 40. A communication hole 56 communicating with the discharge unit 60 is provided in a center of the screw facing surface 52.

Figure 3:
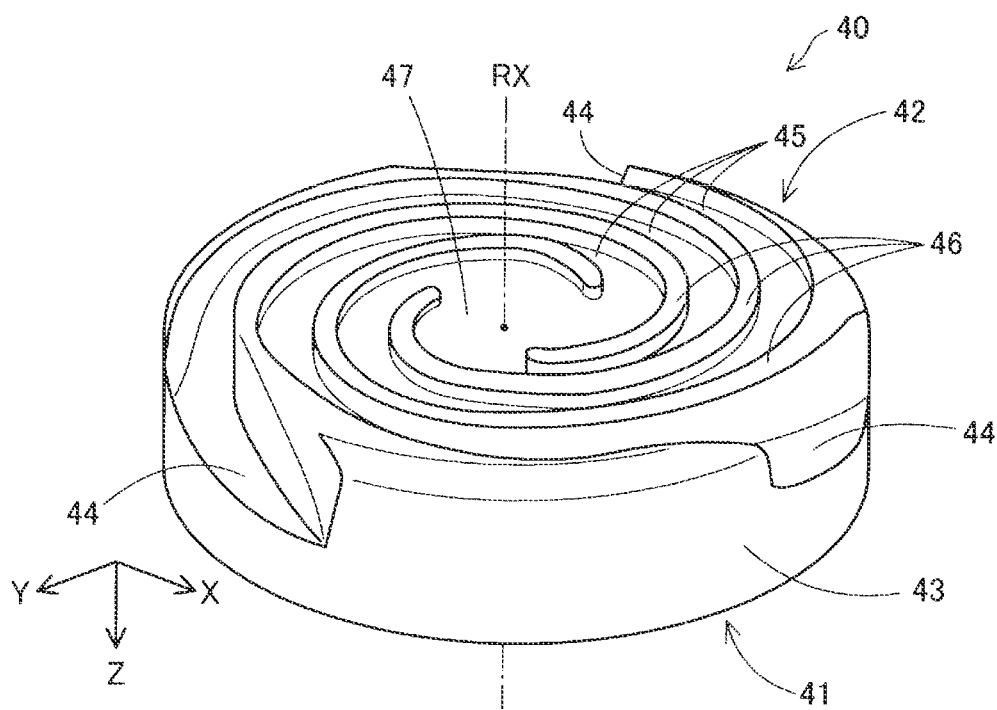
FIG. 3 is a perspective view showing a configuration of a flat screw.

FIG. 3 is a perspective view showing a configuration of the flat screw 40. In FIG. 3, the flat screw 40 is shown upside down from that in FIG. 1 so as to facilitate understanding of the technique. In FIG. 3, a position of the central axis RX of the flat screw 40 is shown by a dashed line. A central portion 47 of the groove forming surface 42 of the flat screw 40 is formed into a recess to which one end of the groove portion 45 is coupled. The central portion 47 faces the communication hole 56 of the barrel 50 shown in FIG. 1. The central portion 47 intersects the central axis RX. In the present embodiment, the groove portion 45 extends in a vortex shape in a manner of drawing an arc from the central portion 47 toward an outer periphery of the flat screw 40. The groove portions 45 may be formed in an involute curve shape or may be formed to extend in a spiral shape. The groove forming surface 42 is provided with ridge portions 46 each constituting a side wall portion of the groove portion 45 and extends along the groove portion 45. The groove portions 45 are continuous up to material introduction ports 44 formed on a side surface 43 of the flat screw 40. The material introduction port 44 is a portion that receives the material MR supplied via the supply path 22 of the material supply unit 20. The material MR introduced from the material introduction ports 44 into the groove portions 45 is transported toward the central portion 47 in the groove portion 45 by rotation of the flat screw 40.

FIG. 3 shows the flat screw 40 having three groove portions 45 and three ridge portions 46. The number of the groove portions 45 and the number of the ridge portions 46 provided at the flat screw 40 are each not limited to three. The flat screw 40 may be provided with only one groove portion 45, or two or a plurality of groove portions 45. Alternatively, any number of the ridge portions 46 corresponding to the number of the groove portions 45 may be provided. FIG. 3 shows the flat screw 40 in which the material introduction ports 44 are formed at three positions. The number of positions of the material introduction ports 44 provided in the flat screw 40 is not limited to three. The flat screw 40 may be provided with the material introduction port 44 at only one position, or at two or a plurality of positions.

Figure 4:
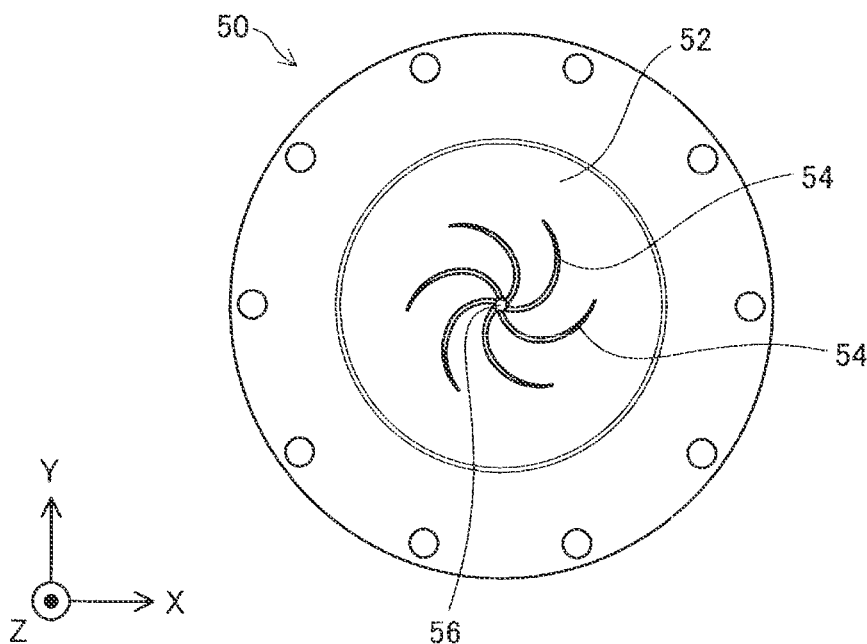
FIG. 4 is a top view showing a configuration of a barrel.

FIG. 4 is a top view showing a configuration of the barrel 50. As described above, the communication hole 56 communicating with the discharge unit 60 is provided at the center of the screw facing surface 52. The screw facing surface 52 is provided with a plurality of guide grooves 54 around the communication hole 56. Each of the guide grooves has one end coupled to the communication hole 56, and extends in a vortex shape in a manner of drawing an arc from the communication hole 56 toward an outer periphery of the screw facing surface 52. Each of the guide grooves 54 has a function of guiding the plasticized material to the communication hole 56. The guide grooves 54 may not be provided on the screw facing surface 52.

As shown in FIG. 1, the heater 58 for heating the material MR is fixed to a lower end portion of the barrel 50. In the present embodiment, the heater 58 has a ring-shaped outer shape and is disposed so as to surround the communication hole 56. A temperature of the heater 58 is controlled by the control unit 500. The material MR transported into the groove portion 45 is plasticized by shearing due to the rotation of the flat screw 40 and heat from the heater 58, and becomes a pasty plasticized material. The plasticized material is pressure-fed from the communication hole 56 to the discharge unit 60 by the rotation of the flat screw 40.

As shown in FIG. 2, in the present embodiment, the discharge unit 60 includes four nozzles 68A to 68D. The discharge unit 60 is constituted by a first flow path member 61 fixed to the lower end portion of the barrel 50 and a second flow path member 62 fixed to a lower end portion of the first flow path member 61. The nozzles 68A to 68D are disposed side by side along the Y direction at a lower end portion of the second flow path member 62. The discharge unit 60 discharges the plasticized material in a continuous linear form from each of the nozzles 68A to 68D toward the stage 300. In the following description, the nozzles 68A to 68D may be referred to as a first nozzle 68A, a second nozzle 68B, a third nozzle 68C, and a fourth nozzle 68D in order from a −Y direction side. Letters "A" to "D" attached to ends of the reference numerals of the nozzles 68A to 68D are letters attached to distinguish the nozzles 68A to 68D from each other. In the following description, when the nozzles 68A to 68D are described without being particularly distinguished from each other, the letters "A" to "D" are not added to the ends of the reference numerals. The number of nozzles 68 provided in the discharge unit 60 is not limited to four, and may be two, three, five or more.

Discharge ports 69A to 69D for discharging the plasticized material are provided at tip end portions of the nozzles 68A to 68D at a −Z direction side. In the present embodiment, an opening shape of each of the discharge ports 69A to 69D is a rectangle of which a longitudinal direction is along the Y direction. The discharge ports 69A to 69D have the same size. The opening shape of each of the discharge ports 69A to 69D is not limited to a rectangle, and may be, for example, a square, a polygon other than a quadrangle, or a circle.

In the present embodiment, the nozzles 68A to 68D are disposed in a staggered manner in the discharge unit 60. More specifically, the discharge unit 60 includes a first nozzle row constituted by the first nozzle 68A and the third nozzle 68C, and a second nozzle row constituted by the second nozzle 68B and the fourth nozzle 68D. The first nozzle 68A and the third nozzle 68C constituting the first nozzle row are disposed side by side on a straight line parallel to the Y direction. The second nozzle row is disposed on a −X direction side with respect to the first nozzle row at an interval from the first nozzle row in the X direction. The second nozzle 68B and the fourth nozzle 68D constituting the second nozzle row are disposed side by side on a straight line parallel to the Y direction. Positions of the nozzles 68A, 68C constituting the first nozzle row in the Y direction are different from positions of the nozzles 68B, 68D constituting the second nozzle row in the Y direction. The second nozzle 68B is disposed between the first nozzle 68A and the third nozzle 68C in the Y direction, and the third nozzle 68C is disposed between the second nozzle 68B and the fourth nozzle 68D in the Y direction. The nozzles 68A to 68D may be disposed side by side in a straight line instead of being disposed in a staggered manner.

In the present embodiment, the first nozzle 68A and the second nozzle 68B are disposed such that a peripheral edge portion of the discharge port 69A of the first nozzle 68A on a +Y direction side and a peripheral edge portion of the discharge port 69B of the second nozzle 68B on the −Y direction side are at the same position in the Y direction. The second nozzle 68B and the third nozzle 68C are disposed such that a peripheral edge portion of the discharge port 69B of the second nozzle 68B on the +Y direction side and a peripheral edge portion of the discharge port 69C of the nozzle 68C on the −Y direction side are at the same position in the Y direction. The third nozzle 68C and the fourth nozzle 68D are disposed such that a peripheral edge portion of the discharge port 69C of the third nozzle 68C on the +Y direction side and a peripheral edge portion of the discharge port 69D of the fourth nozzle 68D on the −Y direction side are at the same position in the Y direction. That is, in the present embodiment, when viewed in the +X direction or the −X direction, the nozzles 68A to 68D are disposed such that the discharge ports 69 of the adjacent nozzles 68 are in contact with each other.

Figure 5:
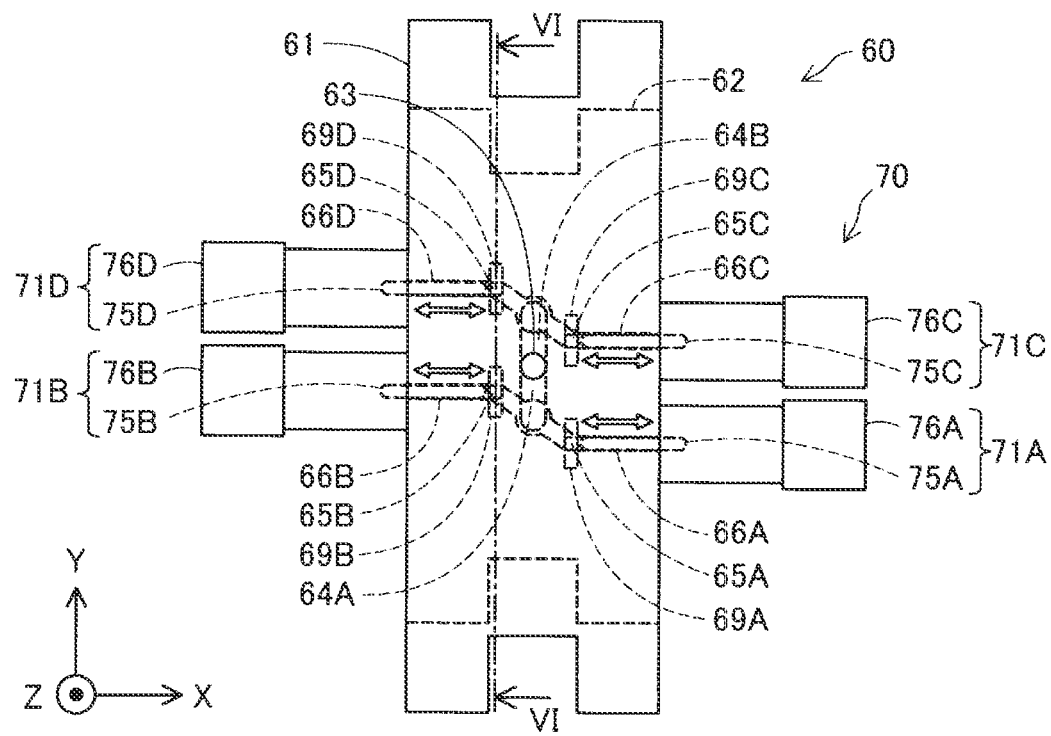
FIG. 5 is a top view showing a configuration of a discharge unit and a discharge amount adjustment unit.
Figure 6:
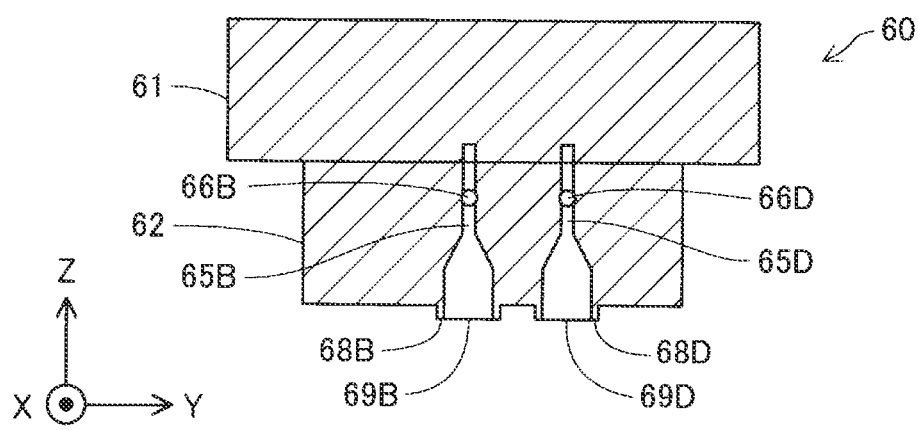
FIG. 6 is a cross-sectional view taken along a line VI-VI in FIG. 5.

FIG. 5 is a top view showing a configuration of the discharge unit 60 and the discharge amount adjustment unit 70. FIG. 6 is a cross-sectional view taken along a line VI-VI in FIG. 5. As shown in FIG. 5, the discharge unit 60 includes one common flow path 63, two branch flow paths 64A, 64B, and four individual flow paths 65A to 65D. Each of the individual flow paths 65A to 65D is provided for each of the nozzles 68A to 68D. An upstream end portion of the common flow path 63 communicates with the communication hole 56 of the barrel 50. A downstream end portion of the common flow path 63 communicates with the first branch flow path 64A and the second branch flow path 64B. A downstream end portion of the first branch flow path 64A communicates with the first individual flow path 65A and the second individual flow path 65B. A downstream end portion of the second branch flow path 64B communicates with the third individual flow path 65C and the fourth individual flow path 65D. As shown in FIG. 6, the first individual flow path 65A communicates with the discharge port 69A of the first nozzle 68A, and the second individual flow path 65B communicates with the discharge port 69B of the second nozzle 68B. The third individual flow path 65C communicates with the discharge port 69C of the third nozzle 68C, and the fourth individual flow path 65D communicates with the discharge port 69D of the fourth nozzle 68D.

The common flow path 63 is constituted by a through hole provided in the first flow path member 61 along the Z direction. Each of the branch flow paths 64A, 64B is constituted by a groove provided in a bottom surface of the first flow path member 61 in a horizontal direction. Each of the individual flow paths 65A to 65D is constituted by a groove provided in an upper surface of the second flow path member 62 along the horizontal direction and a through hole provided in the second flow path member 62 along the Z direction. A length of a flow path from the downstream end portion of the common flow path 63 to the discharge port 69A of the first nozzle 68A, a length of a flow path from the downstream end portion of the common flow path 63 to the discharge port 69B of the second nozzle 68B, a length of a flow path from the downstream end portion of the common flow path 63 to the discharge port 69C of the third nozzle 68C, and a length of a flow path from the downstream end portion of the common flow path 63 to the discharge port 69D of the fourth nozzle 68D are the same. Therefore, pressure losses when the plasticized material flows from the downstream end portion of the common flow path 63 to each of the discharge ports 69A to 69D can be equalized.

As shown in FIG. 5, the discharge amount adjustment unit 70 individually adjusts an amount of the plasticized material discharged from each of the nozzles 68A to 68D. The amount of the plasticized material discharged from each nozzle is referred to as a discharge amount. In the present embodiment, the discharge amount adjustment unit 70 is constituted by valves 71A to 71D respectively provided for the individual flow paths 65A to 65D. The valves 71A to 71D include valve portions 75A to 75D and valve drive units 76A to 76D, respectively.

In the present embodiment, each of the valve portions 75A to 75D has a columnar outer shape having a central axis along the X direction. The second flow path member 62 of the discharge unit 60 is provided with, for each of the individual flow paths 65A to 65D, cylindrical cylinder portions 66A to 66D each having a central axis along the X direction. The valve portions 75A to 75D are disposed in the cylinder portions 66A to 66D, respectively.

In the present embodiment, under the control of the control unit 500, the valve drive units 76A to 76D translationally move the valve portions 75A to 75D along the X direction to individually open and close the individual flow paths 65A to 65D. For example, the valve drive unit 76A moves the valve portion 75A from a position shown in FIG. 5 toward the +X direction to close the first individual flow path 65A by the valve portion 75A, and returns the valve unit 75A to the position shown in FIG. 5 to open the first individual flow path 65A. By individually opening and closing the individual flow paths 65A to 65D, an on/off state of the discharge of the plasticized material from the nozzles 68A to 68D is individually switched. The valve drive units 76A to 76D may be configured to not only switch the on/off state of the discharge of the plasticized material from the nozzles 68A to 68D, but also adjust flow path cross-sectional areas of the individual flow paths 65A to 65D by adjusting positions of the valve portions 75A to 75D so as to be capable of adjusting the discharge amounts of the plasticized material from the nozzles 68A to 68D. In the following description, a state in which the plasticized material is discharged from the nozzle 68, in other words, a state in which the discharge of the plasticized material from the nozzle 68 is not stopped is referred to as a discharge-on state, and a state in which the discharge of the plasticized material from the nozzle 68 is stopped is referred to as a discharge-off state. In the present embodiment, the valve drive units 76A to 76D are pneumatic valve drive units that drive the valve portions 75A to 75D by using compressed air supplied from a compressor. The valve drive units 76A to 76D are not limited to the pneumatic valve drive units, and may be solenoid valve drive units that drive the valve portions 75A to 75 by using an electromagnetic force generated by a solenoid, or may be electric valve drive units that drive the valve portions 75A to 75D by using a rotational force generated by a motor. The valves 71A to 71D may individually and respectively open and close the individual flow paths 65A to 65D by a rotation operation of the valve portions 75A to 75D instead of the translational operation of the valve portions 75A to 75D. In this case, each of the valves 71A to 71D may be constituted by, for example, a butterfly valve.

As shown in FIGS. 1 and 2, the first surface activation unit 210A is disposed on a +X direction side with respect to each of the nozzles 68A to 68D and on a +Z direction side with respect to each of the nozzles 68A to 68D. A first support portion 35 is fixed to a side surface of the screw case 31 on the +X direction side, and the first surface activation unit 210A is fixed to the first support portion 35. The second surface activation unit 210B is disposed on the −X direction side with respect to each of the nozzles 68A to 68D and on the +Z direction side with respect to each of the nozzles 68A to 68D. A second support portion 36 is fixed to a side surface of the screw case 31 on the −X direction side, and the second surface activation unit 210B is fixed to the second support portion 36. Each of the surface activation units 210A, 210B chemically activates a surface of a shaping layer formed on the stage 300. In the present embodiment, each of the surface activation units 210A, 210B is constituted by an atmospheric pressure plasma device. Each of the surface activation units 210A, 210B chemically activates the surface of the shaping layer by irradiating the shaping layer formed on the stage 300 with plasma under the control of the control unit 500, so as to increase surface free energy of the shaping layer, in other words, wettability of the shaping layer. Each of the surface activation units 210A, 210B may chemically activate the surface of the shaping layer by irradiating the shaping layer with an ion beam or ultraviolet rays instead of irradiating the shaping layer with the plasma.

The first heating and cooling unit 220A is disposed between each of the nozzles 68A to 68D and the first surface activation unit 210A in the X direction and on the +Z direction side with respect to each of the nozzles 68A to 68D. The first heating and cooling unit 220A is fixed to the first support portion 35. The second heating and cooling unit 220B is disposed between each of the nozzles 68A to 68D and the second surface activation unit 210B in the X direction and on the +Z direction side with respect to each of the nozzles 68A to 68D. The second heating and cooling unit 220B is fixed to the second support portion 36. Each of the heating and cooling units 220A, 220B has both a function of heating an upper surface of the shaping layer formed on the stage 300 and a function of cooling the shaping layer formed on the stage 300. In the present embodiment, each of the heating and cooling units 220A, 220B is constituted by a blower having both a function of sending hot air heated by a built-in heater and a function of sending cold air. The hot air refers to a flow of air or an inert gas at a temperature equal to or higher than a glass transition point of the material MR. The cold air refers to a flow of air or an inert gas at a temperature lower than the glass transition point of the material MR. The temperature of the cold air is preferably equal to or lower than a room temperature of an installation place of the three-dimensional shaping device 100. Under the control of the control unit 500, each of the heating and cooling units 220A, 220B heats the upper surface of the shaping layer to a temperature equal to or higher than the glass transition point by blowing the hot air toward the shaping layer formed on the stage 300. Further, under the control of the control unit 500, each of the heating and cooling units 220A, 220B blows the cold air toward an uncured shaping layer formed of the plasticized material discharged from each of the nozzles 68A to 68D, thereby cooling the shaping layer and promoting curing. The first heating and cooling unit 220A may be disposed on the +X direction side with respect to the first surface activation unit 210A. The second heating and cooling unit 220B may be disposed on the −X direction side with respect to the second surface activation unit 210B.

The first flattening unit 230A is disposed between each of the nozzles 68A to 68D and the first heating and cooling unit 220A in the X direction. The first flattening unit 230A is fixed to the lower end portion of the screw case 31. The second flattening unit 230B is disposed between each of the nozzles 68A to 68D and the second heating and cooling unit 220B in the X direction. The second flattening unit 230B is fixed to the lower end portion of the screw case 31. In the present embodiment, each of the flattening units 230A, 230B includes a roller 231 and a roller support portion 232 that supports the roller 231. The roller 231 is disposed such that a rotation axis thereof is parallel to the Y direction. The roller support portion 232 has a function of raising and lowering the roller 231 under the control of the control unit 500, and is configured to be capable of changing a distance between the stage 300 and the roller 231 in the Z direction. Each of the flattening units 230A, 230B presses, by using the roller 231, the uncured shaping layer formed of the plasticized material discharged from each of the nozzles 68A to 68D to flatten the shaping layer.

As shown in FIG. 1, the stage 300 is disposed on the −Z direction side with respect to the discharge unit 60. As described above, the stage 300 has the deposition surface 310 that faces the nozzles 68A to 68D and on which the plasticized material discharged from each of the nozzles 68A to 68D is deposited. In the present embodiment, the deposition surface 310 is provided parallel to the horizontal plane. The stage 300 is supported by the moving unit 400.

The moving unit 400 changes a relative position between the discharge unit 60 and the deposition surface 310. In the present embodiment, the moving unit 400 changes the relative position between the discharge unit 60 and the deposition surface 310 by moving the stage 300. The moving unit 400 according to the present embodiment is constituted by a three-axis positioner that moves the stage 300 in three-axis directions which are the X, Y, Z directions by power generated by three motors. Each motor is driven under the control of the control unit 500. The moving unit 400 may be configured to change the relative position between the discharge unit 60 and the deposition surface 310 by moving the shaping unit 200 without moving the stage 300. The moving unit 400 may be configured to change the relative position between the discharge unit 60 and the deposition surface 310 by moving both the shaping unit 200 and the stage 300. The moving unit 400 may not have a function of changing the relative position of the discharge unit 60 and the deposition surface 310 in the Y direction.

The control unit 500 is constituted by a computer including one or a plurality of processors, a main storage device, and an input and output interface that receives a signal from an outside and outputs a signal to the outside. In the present embodiment, the control unit 500 exerts various functions by the processor executing a program or a command read from the main storage device. For example, the control unit 500 shapes a three-dimensional shaped object on the stage 300 by executing a three-dimensional shaping process to be described later. The control unit 500 may be constituted by a combination of a plurality of circuits instead of the computer.

Figure 7:
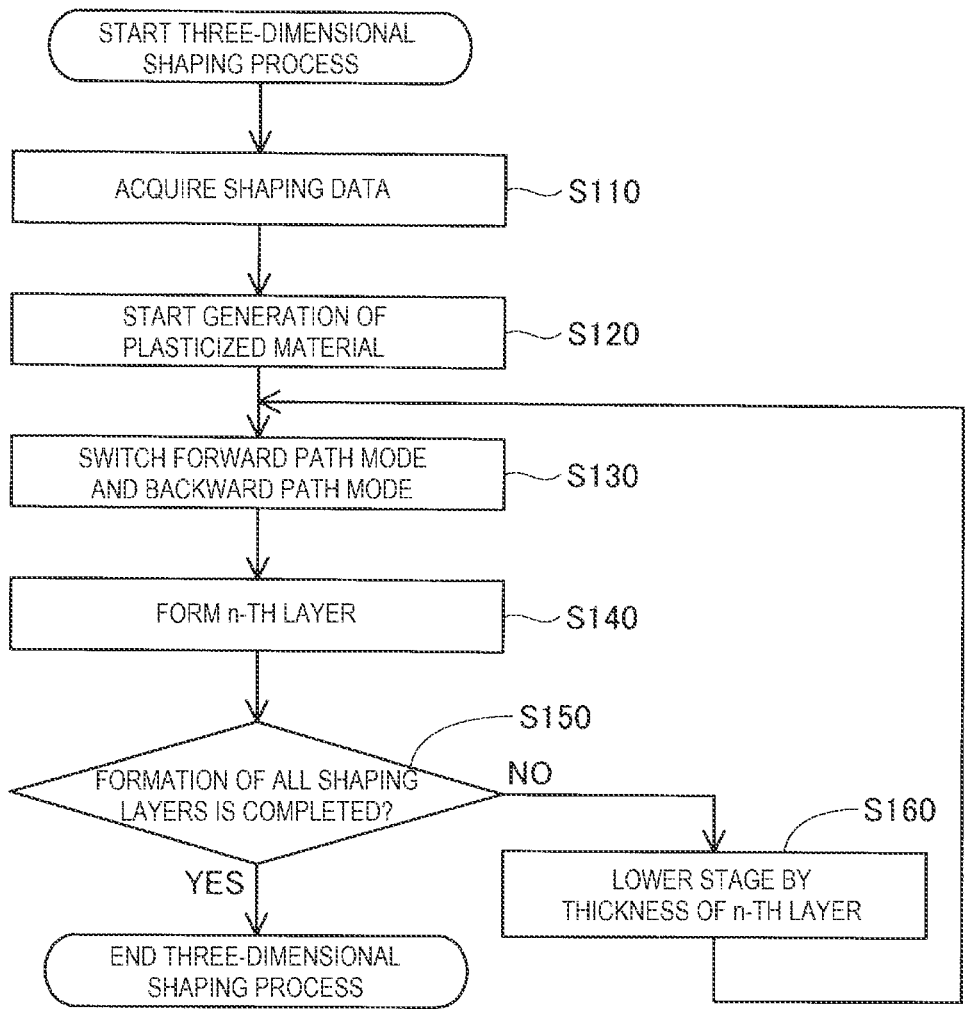
FIG. 7 is a flowchart showing contents of a three-dimensional shaping process.

FIG. 7 is a flowchart showing contents of the three-dimensional shaping process for shaping a three-dimensional shaped object. The process is executed by the control unit 500 when a predetermined start operation is performed by a user on an operation panel provided in the three-dimensional shaping device 100 or a computer coupled to the three-dimensional shaping device 100.

First, in step S110, the control unit 500 acquires shaping data for shaping a three-dimensional shaped object. The shaping data is data representing information related to a target value of a rotation speed of the flat screw 40, a target value of a relative speed of the shaping unit 200 with respect to the stage 300, a target value of the discharge amount of the plasticized material discharged from each nozzle 68 provided in the discharge unit 60, a target position at which the plasticized material discharged from each nozzle 68 is deposited on the stage 300, and the like. The shaping data is created, for example, by causing slicer software installed in a computer coupled to the three-dimensional shaping device 100 to read shape data. The shape data is data representing a target shape of a three-dimensional shaped object created by using three-dimensional CAD software, three-dimensional CG software, or the like. As the shape data, data in an STL format, an AMF format, or the like can be used. The slicer software divides the target shape of the three-dimensional shaped object into shaping layers having a predetermined thickness, and creates the shaping data for each layer. The shaping data is represented by a G code, an M code, or the like. The control unit 500 acquires the shaping data from the computer coupled to the three-dimensional shaping device 100 or a recording medium such as a USB memory.

Next, in step S120, the control unit 500 controls the plasticizing unit 30 according to the shaping data to start generation of the plasticized material. The control unit 500 controls the rotation speed of the flat screw 40 and the temperature of the heater 58 provided in the barrel 50 to plasticize the material, thereby generating the plasticized material. The plasticized material continues to be generated while the three-dimensional shaping process is performed.

Next, in step S130, the control unit 500 switches an operation mode of the three-dimensional shaping device 100. In the present embodiment, the three-dimensional shaping device 100 has a forward path mode and a backward path mode, and the control unit 500 switches the operation mode to the forward path mode when forming an odd-numbered layer which is a shaping layer formed at an odd-numbered position, and switches the operation mode to the backward path mode when forming an even-numbered layer which is a shaping layer formed at an even-numbered position. In the forward path mode, the irradiation of the plasma from the first surface activation unit 210A is turned on, the irradiation of the plasma from the second surface activation unit 210B is turned off, the hot air is sent out from the first heating and cooling unit 220A, the cold air is sent out from the second heating and cooling unit 220B, flattening of the shaping layer performed by the first flattening unit is turned off, and flattening of the shaping layer performed by the second flattening unit is turned on. On the other hand, in the backward path mode, the irradiation of the plasma from the first surface activation unit 210A is turned off, the irradiation of the plasma from the second surface activation unit 210B is turned on, the cold air is sent out from the first heating and cooling unit 220A, the hot air is sent out from the second heating and cooling unit 220B, the flattening of the shaping layer performed by the first flattening unit is turned on, and the flattening of the shaping layer performed by the second flattening unit is turned off.

In step S140, the control unit 500 executes, in a simultaneous and parallel manner, a first control of controlling the rotation speed of the flat screw 40, a second control of controlling the discharge amount of the plasticized material from each of the nozzles 68A to 68D by the discharge amount adjustment unit 70, and a third control of controlling a relative speed of the discharge unit 60 with respect to the stage 300, so as to form the shaping layer. That is, in step S140, the control unit 500 repeats a first step of plasticizing the material by using the rotation of the flat screw 40 by the first control to generate the plasticized material, a second step of adjusting a supply amount of the plasticized material to each of the nozzles 68A to 68D, in other words, the discharge amount of the plasticized material from each of the nozzles 68A to 68D by the second control, and a third step of discharging the plasticized material from each of the nozzles 68A to 68D toward the stage 300 while relatively moving the shaping unit 200 with respect to the stage 300 by the third control, thereby forming the shaping layer. In the forward path mode, the control unit 500 executes the third control, so that the shaping unit 200 moves in the +X direction with respect to the stage 300. On the other hand, in the backward path mode, the control unit 500 executes the third control, so that the shaping unit 200 moves in the −X direction with respect to the stage 300. In the present embodiment, in the forward path mode and the backward path mode, the control unit 500 forms the shaping layer while executing a deposition amount variation reduction process. Contents of the deposition amount variation reduction process and a state in which the shaping layer is formed will be described later.

Thereafter, in step S150, the control unit 500 determines whether formation of all shaping layers is completed. The control unit 500 can determine that the formation of all shaping layers is completed by using the shaping data. When it is determined in step S150 that the formation of all shaping layers is not completed, the control unit 500 controls the moving unit 400 to lower the stage 300 by a thickness of the shaping layer in step S160, and then returns the process to step S130. The control unit 500 repeats the process of step S160 and the process from step S130 to step S150 to laminate the shaping layer on the stage 300 until it is determined in step S150 that the formation of all shaping layers is completed. When it is determined in step S150 that the formation of all shaping layers is completed, the control unit 500 ends the process.

Figure 8:
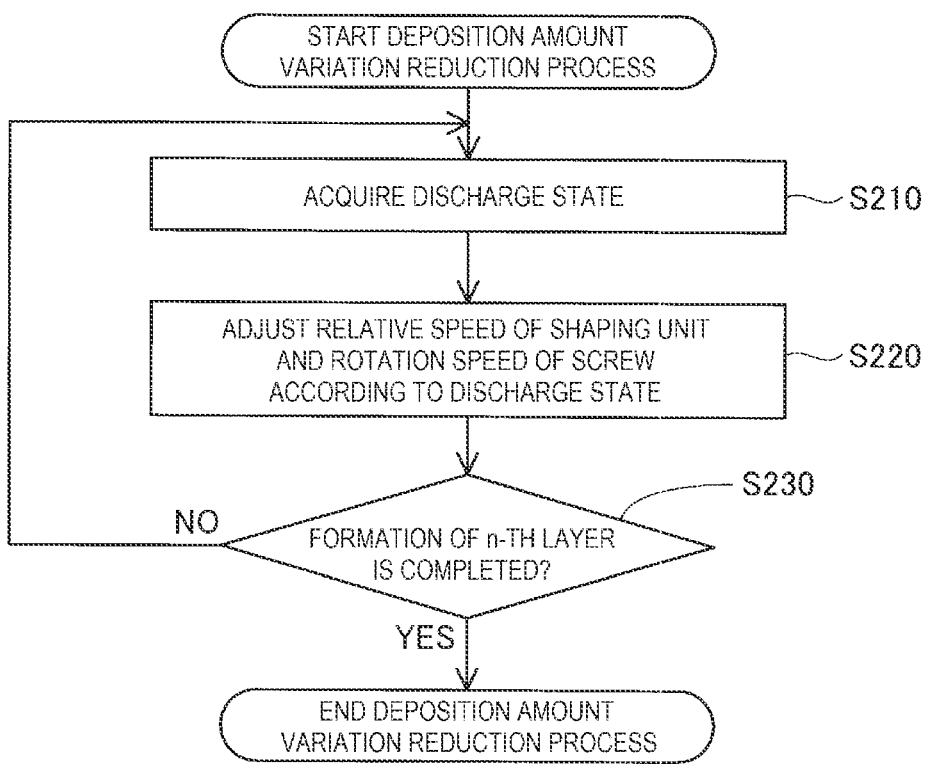
FIG. 8 is a flowchart showing contents of a deposition amount variation reduction process.

FIG. 8 is a flowchart showing the contents of the deposition amount variation reduction process. The process is started by the control unit 500 when the process of step S140 shown in FIG. 7 is started. First, in step S210, the control unit 500 acquires a discharge state of the plasticized material from each of the nozzles 68A to 68D. The discharge state includes a state of a pressure of the plasticized material discharged from each of the nozzles 68A to 68D, a state of the discharge amount of the plasticized material discharged from each of the nozzles 68A to 68D, and a state of a line width of the plasticized material discharged from each of the nozzles 68A to 68D, in addition to the on/off state of the discharge of the plasticized material from each of the nozzles 68A to 68D. In the present embodiment, the control unit 500 acquires the on/off state of the discharge of the plasticized material from each of the nozzles 68A to 68D as the discharge state. More specifically, the control unit 500 acquires the number of nozzles 68 that are in the discharge-on state by the discharge amount adjustment unit 70 among the four nozzles 68A to 68D. For example, when the control unit 500 causes the valve 71 of the discharge amount adjustment unit 70 to execute a valve opening operation, the control unit 500 stores, in a storage unit, that the valve 71 is in an open state, that is, the nozzle 68 corresponding to the valve 71 is in the discharge-on state, and when the control unit 500 causes the valve 71 of the discharge amount adjustment unit 70 to execute a valve closing operation, the control unit 500 stores, in the storage unit, that the valve 71 is in a closed state, that is, the nozzle 68 corresponding to the valve 71 is in the discharge-off state. The control unit 500 can acquire the number of nozzles 68 in the discharge-on state by reading the on/off state of the discharge of the plasticized material from each of the nozzles 68A to 68D stored in the storage unit. An encoder that detects the position of each of the valve portions 75A to 75D may be provided in each of the valves 71A to 71D, and the control unit 500 may acquire the number of nozzles 68 in the discharge-on state by using information from each encoder. In the following description, the nozzle 68 in the discharge-on state is referred to as a discharge-on nozzle, and the nozzle 68 in the discharge-off state is referred to as a discharge-off nozzle.

In step S220, the control unit 500 controls the relative speed of the shaping unit 200 with respect to the stage 300 and the rotation speed of the flat screw 40 based on the on/off state of the discharge of the plasticized material from each of the nozzles 68A to 68D. At this time, the control unit 500 adjusts the relative speed of the shaping unit 200 with respect to the stage 300 and the rotation speed of the flat screw 40, such that a deposition amount of the plasticized material per unit area on the stage 300 is the same before and after a change in the number of discharge-on nozzles. In the present embodiment, the control unit 500 adjusts the relative speed of the shaping unit 200 with respect to the stage 300 and the rotation speed of the flat screw 40 by using a map representing a relationship of the number of discharge-on nozzles, the relative speed of the shaping unit 200 with respect to the stage 300, and the rotation speed of the flat screw 40. The map is created by a test performed in advance, and is stored in the storage unit of the control unit 500. The map is preferably created for each type of the material MR used for shaping a three-dimensional shaped object. The control unit 500 may adjust the relative speed of the shaping unit 200 with respect to the stage 300 and the rotation speed of the flat screw 40 by using a function representing a relationship of the number of discharge-on nozzles, the relative speed of the shaping unit 200 with respect to the stage 300, and the rotation speed of the flat screw 40.

In step S230, the control unit 500 determines whether the formation of the shaping layer is completed. The control unit 500 repeats the process from step S210 to step S230 until it is determined in step S230 that the formation of the shaping layer is completed. When it is determined in step S230 that the formation of the shaping layer is completed, the control unit 500 ends the process. Thereafter, when another shaping layer is to be formed on the shaping layer, the control unit 500 starts this process again.

Figure 9:
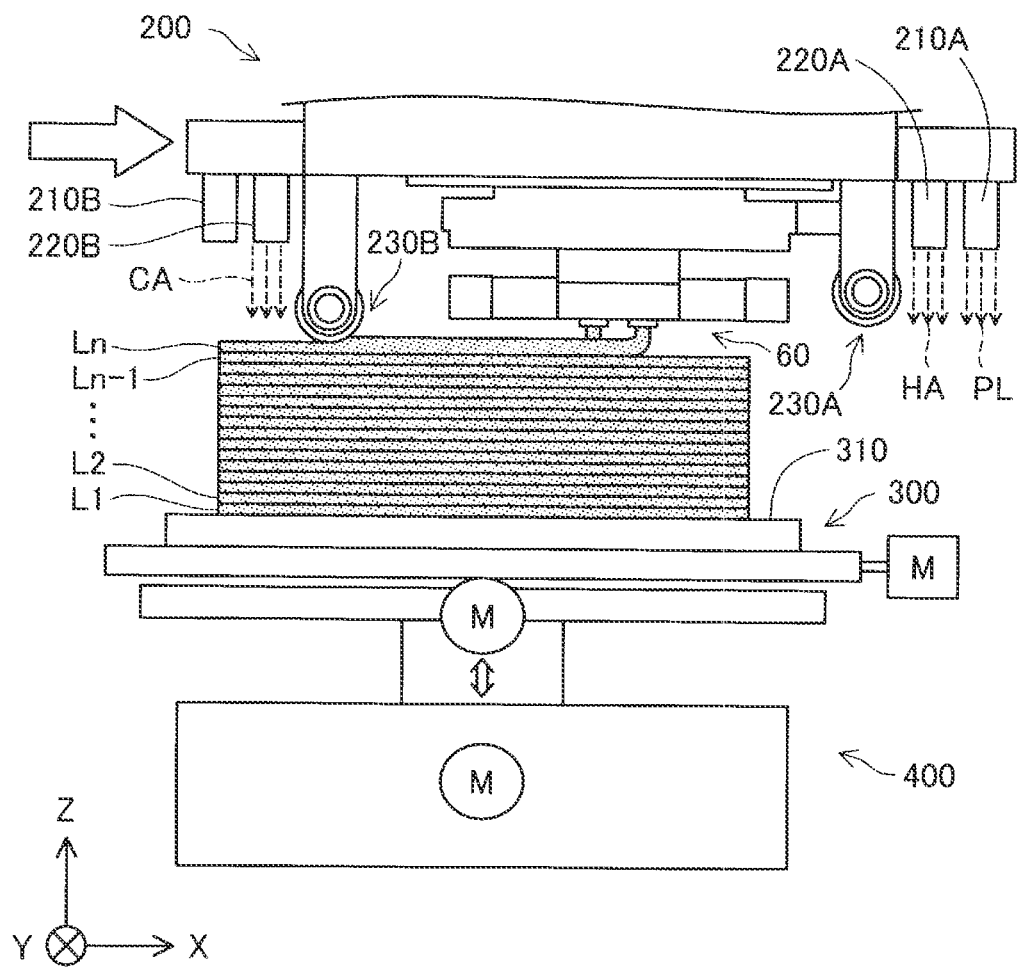
FIG. 9 is a side view schematically showing a state in which an odd-numbered shaping layer is formed.
Figure 10:
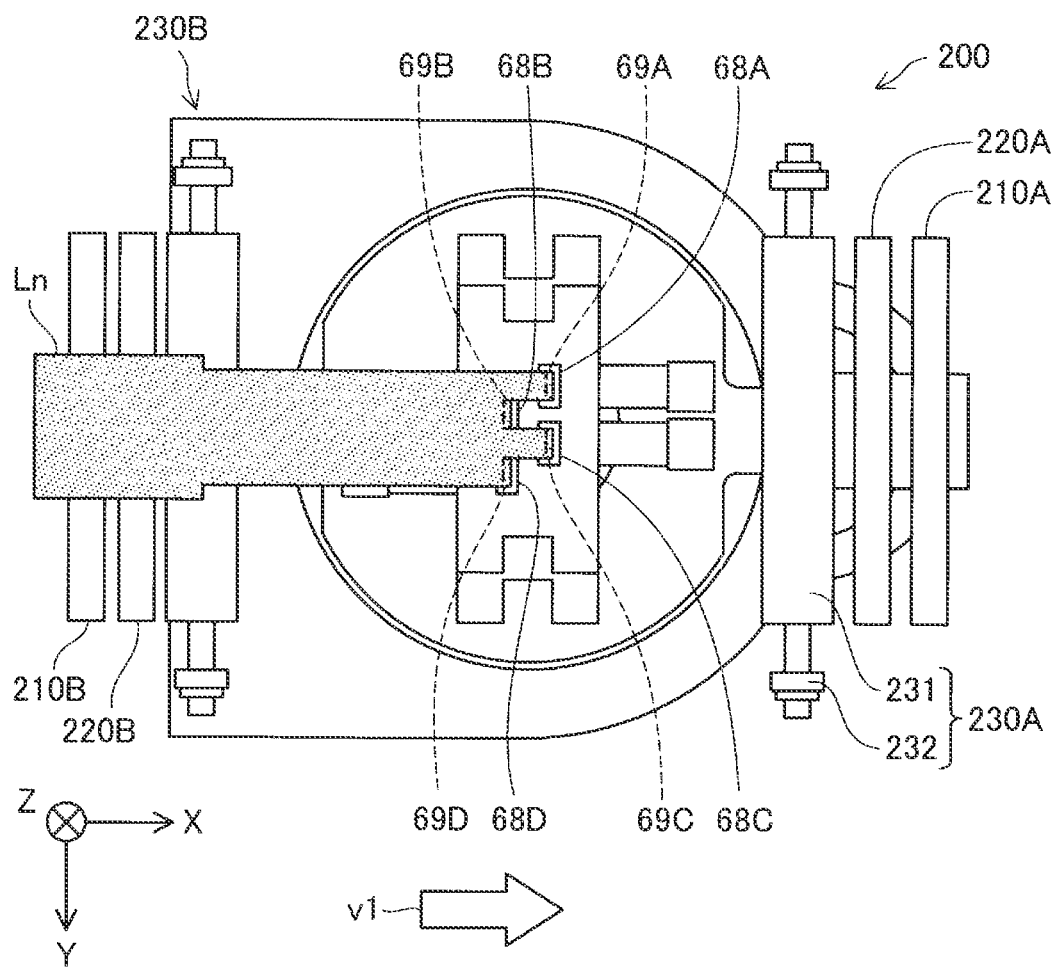
FIG. 10 is a first bottom view schematically showing the state in which the odd-numbered shaping layer is formed.
Figure 11:
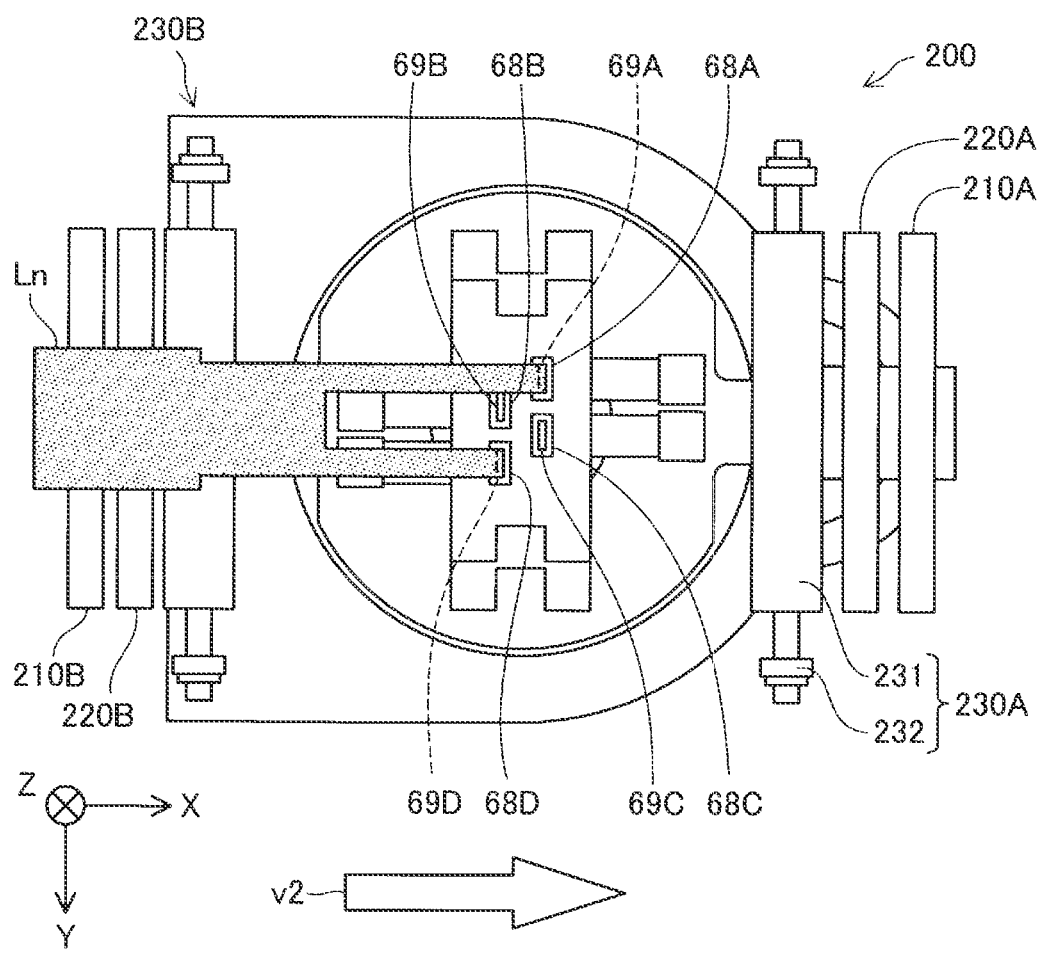
FIG. 11 is a second bottom view schematically showing the state in which the odd-numbered shaping layer is formed.

FIG. 9 is a side view schematically showing a state in which an odd-numbered shaping layer is formed by the three-dimensional shaping device 100 according to the present embodiment. FIG. 10 is a first bottom view schematically showing the state in which the odd-numbered shaping layer is formed by the three-dimensional shaping device 100 according to the present embodiment. FIG. 11 is a second bottom view schematically showing the state in which the odd-numbered shaping layer is formed by the three-dimensional shaping device 100 according to the present embodiment. As shown in FIG. 9, in the present embodiment, when n is an odd number equal to or greater than 1, the control unit 500 controls the moving unit 400 to relatively move the shaping unit 200 with respect to the stage 300 in the +X direction when forming an n-th layer $L_n$ that is an n-th shaping layer to be formed. Before the formation of the n-th layer $L_n$ is started, the shaping unit 200 is disposed on the −X direction side with respect to an end portion of the stage 300 on the −X direction side. Prior to the formation of the n-th layer $L_n$, the three-dimensional shaping device 100 is switched to the forward path mode. That is, the irradiation of the plasma from the first surface activation unit 210A is turned on, the irradiation of the plasma from the second surface activation unit 210B is turned off, the hot air is sent out from the first heating and cooling unit 220A, the cold air is sent out from the second heating and cooling unit 220B, the flattening of the shaping layer performed by the first flattening unit 230A is turned off, and the flattening of the shaping layer performed by the second flattening unit 230B is turned on.

As the shaping unit 200 relatively moves with respect to the stage 300 in the +X direction, the first surface activation unit 210A, the first heating and cooling unit 220A, the first flattening unit 230A, the discharge unit 60, the second flattening unit 230B, the second heating and cooling unit 220B, and the second surface activation unit 210B provided on the shaping unit 200 pass over an (n−1)-th layer $L_{n-1}$ in this order. When a first layer $L_1$ is formed, the first layer $L_1$ passes over the stage 300 in the above-described order.

An upper surface of the (n−1)-th layer $L_{n-1}$ is chemically activated by being irradiated with plasma PL from the first surface activation unit 210A passing over the (n−1)-th layer $L_{n-1}$. Hot air HA is blown from the first heating and cooling unit 220A passing over the (n−1)-th layer $L_{n-1}$ so that the upper surface of the (n−1)-th layer $L_{n-1}$ is heated to a temperature equal to or higher than a glass transition point. When the first layer $L_1$ is formed, the irradiation of the plasma PL from the first surface activation portion 210A and the sending out of the hot air HA from the first heating and cooling portion 220A may be turned off.

The plasticized material is discharged in a continuous linear form from each nozzle 68 of the discharge unit 60 passing over the (n−1)-th layer $L_{n-1}$. At this time, the control unit 500 controls the discharge amount adjustment unit 70 to individually switch between a start and a stop of the discharge of the plasticized material from each nozzle 68 according to a target shape of a three-dimensional shaped object. The plasticized material discharged from each nozzle 68 is deposited on the (n−1)-th layer $L_{n-1}$ to form the n-th layer $L_n$. Since the upper surface of the (n−1)-th layer $L_{n-1}$ is chemically activated prior to the deposition of the plasticized material, adhesion between the n-th layer $L_n$ and the (n−1)-th layer $L_{n-1}$ is enhanced. Further, since the upper surface of the (n−1)-th layer $L_{n-1}$ is heated to a temperature equal to or higher than the glass transition point prior to the deposition of the plasticized material, the adhesion between the n-th layer $L_n$ and the (n−1)-th layer $L_{n-1}$ is further enhanced. When the first layer $L_1$ is formed, the plasticized material discharged from each nozzle 68 is deposited on the stage 300 to form the first layer $L_1$.

When the number of discharge-on nozzles among the four nozzles 68A to 68D is changed by the discharge amount adjustment unit 70 in a state where the flat screw 40 is rotated at a constant speed, the discharge amount of the plasticized material from one discharge-on nozzle is changed. More specifically, when the number of discharge-on nozzles decreases, the discharge amount of the plasticized material from one discharge-on nozzle increases, and when the number of discharge-on nozzles increases, the discharge amount of the plasticized material from one discharge-on nozzle decreases. In the present embodiment, the control unit 500 executes the deposition amount variation reduction process to control the relative speed of the shaping unit 200 with respect to the stage 300 and the rotation speed of the flat screw 40, so that the deposition amount per unit area on the (n−1)-th layer $L_{n-1}$ or the stage 300 with respect to the plasticized material discharged from one discharge-on nozzle and deposited on the (n−1)-th layer $L_{n-1}$ or the stage 300 is the same before and after a change in the number of discharge-on nozzles. For example, as shown in FIG. 10, when the number of discharge-on nozzles is four, the control unit 500 controls the moving unit 400 such that the relative speed of the shaping unit 200 with respect to the stage 300 becomes a speed v1, and as shown in FIG. 11, when the discharge amount of the plasticized material from the discharge-on nozzles is doubled by changing the number of discharge-on nozzles from four to two, the control unit 500 controls the moving unit 400 such that the relative speed of the shaping unit 200 with respect to the stage 300 becomes a speed v2 which is twice faster than the speed v1. When the relative speed of the shaping unit 200 with respect to the stage 300 cannot be increased, the control unit 500 decreases the rotation speed of the flat screw 40.

As shown in FIG. 9, the uncured n-th layer $L_n$ formed on the (n−1)-th layer $L_{n-1}$ is pressed and flattened by the roller 231 of the second flattening unit 230B. By flattening the n-th layer $L_n$, adhesion between the n-th layer $L_n$ and the stage 300 is increased, and unintended formation of a gap between the n-th layer $L_n$ and the (n−1)-th layer $L_{n-1}$ is prevented. Further, by flattening the n-th layer $L_n$, a thickness of the n-th layer $L_n$ in the Z direction decreases, and as shown in FIG. 10, a line width of each portion of the n-th layer $L_n$ in the Y direction formed of the plasticized material discharged from each nozzle 68 increases. Therefore, adhesion between the portions of the n-th layer $L_n$ formed of the plasticized material discharged from the nozzles 68 adjacent to each other in the Y direction is enhanced, and unintended formation of a gap between the portions is prevented. For example, adhesion between a portion of the n-th layer $L_n$ formed of the plasticized material discharged from the first nozzle 68A and a portion of the n-th layer $L_n$ formed of the plasticized material discharged from the second nozzle 68B is increased, and unintended formation of a gap between the two portions is prevented. When forming the first layer $L_1$, the control unit 500 relatively moves the shaping unit 200 in the +X direction with respect to the stage 300 in a state where the tip end portion of each nozzle 68 and the stage 300 are close to each other, so that the first layer $L_1$ before being flattened by the second flattening unit 230B may be pressed by the tip end portion of each nozzle 68. In this case, since adhesion between the first layer $L_1$ and the stage 300 is increased, it is possible to prevent the first layer $L_1$ from being peeled off from the stage 300 before being flattened by the second flattening unit 230B.

The n-th layer $L_n$ flattened by the second flattening unit 230B is cooled by cold air CA sent from the second heating and cooling unit 220B to promote curing. By cooling the n-th layer $L_n$, a waiting time until the n-th layer $L_n$ is cured is shortened. After the formation of the n-th layer $L_n$ is completed, the control unit 500 controls the moving unit 400 to relatively move the shaping unit 200 with respect to the stage 300 in the +Z direction by the thickness of the n-th layer $L_n$.

Figure 12:
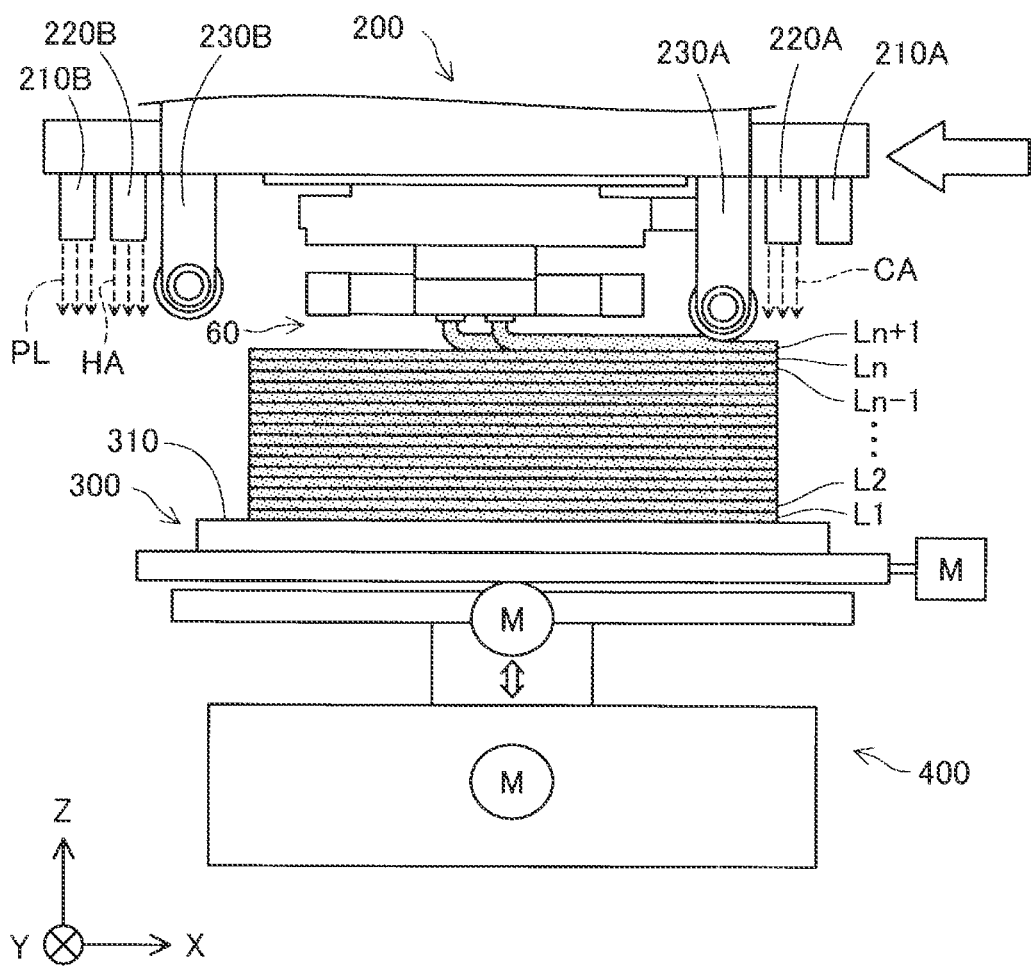
FIG. 12 is a side view schematically showing a state in which an even-numbered shaping layer is formed.

FIG. 12 is a side view schematically showing a state in which an even-numbered shaping layer is formed by the three-dimensional shaping device 100 according to the present embodiment. When n is an odd number equal to or greater than 1, the control unit 500 controls the moving unit 400 to move the shaping unit 200 relative to the stage 300 in the −X direction when forming an (n+1)-th layer $L_{n+1}$ which is a shaping layer formed at an (n+1)-th position, that is, the shaping layer formed at an even-numbered position. Prior to the formation of (n+1)-th layer $L_{n+1}$, the three-dimensional shaping device 100 is switched from the forward path mode to the backward path mode. That is, the irradiation of the plasma from the first surface activation unit 210A is turned off, the irradiation of the plasma from the second surface activation unit 210B is turned on, the cold air is sent out from the first heating and cooling unit 220A, the hot air is sent out from the second heating and cooling unit 220B, the flattening of the shaping layer performed by the first flattening unit 230A is turned on, and the flattening of the shaping layer performed by the second flattening unit 230B is turned off.

As the shaping unit 200 relatively moves with respect to the stage 300 in the −X direction, the second surface activation unit 210B, the second heating and cooling unit 220B, the second flattening unit 230B, the discharge unit 60, the first flattening unit 230A, the first heating and cooling unit 220A, and the first surface activation unit 210A provided on the shaping unit 200 pass over the n-th layer $L_n$ in this order. An upper surface of the n-th layer $L_n$ is chemically activated by being irradiated with the plasma PL from the second surface activation unit 210B passing over the n-th layer $L_n$. The hot air HA is blown from the second heating and cooling unit 220B passing over the n-th layer $L_n$, so that the upper surface of the n-th layer $L_n$ is heated to a temperature equal to or higher than the glass transition point. The (n+1)-th layer $L_{n+1}$ is formed at the n-th layer $L_n$ by discharging the plasticized material from each nozzle 68 of the discharge unit 60 passing over the n-th layer $L_n$. When the (n+1)-th layer $L_{n+1}$ is formed, the deposition amount variation reduction process is executed by the control unit 500. The (n+1)-th layer $L_{n+1}$ before curing formed at the n-th layer $L_n$ is pressed and flattened by the roller 231 of the first flattening unit 230A. The (n+1)-th layer $L_{n+1}$ flattened by the first flattening unit 230A is cooled by the cold air CA sent from the first heating and cooling unit 220A to promote curing.

According to the three-dimensional shaping device 100 of the present embodiment described above, the control unit 500 executes the deposition amount variation reduction process when forming the shaping layer on the stage 300 or on an existing layer which is the already formed shaping layer, so as to control the relative speed of the shaping unit 200 with respect to the stage 300 and the rotation speed of the flat screw 40 based on the discharge state of the plasticized material from each nozzle 68, and thus it is possible to reduce variation in the deposition amount per unit area of the plasticized material discharged from the discharge-on nozzle and deposited on the stage 300 or the existing layer. Therefore, the three-dimensional shaped object can be shaped with high dimensional accuracy.

In the present embodiment, in the deposition amount variation reduction process, the control unit 500 controls the relative speed of the shaping unit 200 with respect to the stage 300 and the rotation speed of the flat screw 40 based on the on/off state of the discharge of the plasticized material from each nozzle 68 as the discharge state of the plasticized material from each nozzle 68. Therefore, the above-described variation in the deposition amount can be prevented by a simple control.

In the present embodiment, in the deposition amount variation reduction process, the control unit 500 increases the relative speed of the shaping unit 200 with respect to the stage 300 when increasing the number of nozzles 68 to be set to the discharge-off state, and decreases the rotation speed of the flat screw 40 when the relative speed of the shaping unit 200 with respect to the stage 300 cannot be increased. Therefore, the above-described variation in the deposition amount can be reliably prevented.

Further, in the present embodiment, the plasticizing unit 30 uses the rotation of the flat screw 40 which is small in the Z direction along a rotation axis, so that the material supplied to the groove portion 45 is plasticized and the plasticized material is generated. Therefore, a size of the plasticizing unit 30 in the Z direction can be reduced.

In the present embodiment, the discharge amount adjustment unit 70 is constituted by the valves 71A to 71D that open and close the individual flow paths 65A to 65D communicating with the nozzles 68A to 68D. Therefore, it is possible to switch the on/off the discharge of the plasticized material from each of the nozzles 68A to 68D with a simple configuration.

B. Second Embodiment

Figure 13:
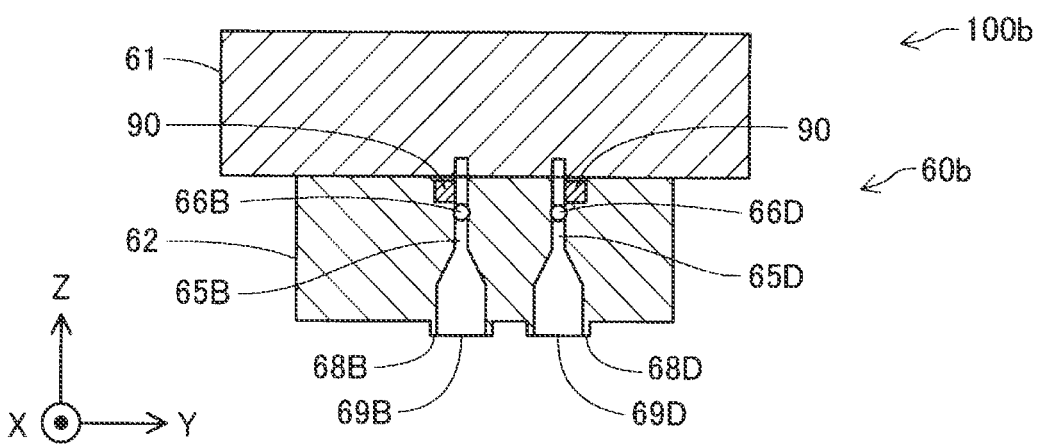
FIG. 13 is an illustrative diagram showing a schematic configuration of a first measurement unit of a three-dimensional shaping device according to a second embodiment.

FIG. 13 is a cross-sectional view showing a schematic configuration of a discharge unit 60b of a three-dimensional shaping device 100b according to a second embodiment. The second embodiment is different from the first embodiment in that a first measurement unit 90 is disposed on each of the four individual flow paths 65A to 65D in the discharge unit 60b, and the control unit 500 acquires the discharge state of the plasticized material from each of the nozzles 68A to 68D by using each of the first measurement units 90 in the deposition amount variation reduction process. Other configurations are the same as those in the first embodiment unless otherwise specified.

Each of the first measurement units 90 is a pressure sensor that detects a pressure in each of the individual flow paths 65A to 65D. Each of the first measurement units 90 is disposed on an upstream portion of the discharge amount adjustment unit 70 in each of the individual flow paths 65A to 65D. FIG. 13 shows the first measurement unit 90 disposed on the second individual flow path 65B and the first measurement unit 90 disposed on the fourth individual flow path 65D. Although not shown, the first measurement units 90 are also disposed on the first individual flow path 65A and the third individual flow path 65C. Each of the first measurement units 90 may be disposed on a downstream portion of the discharge amount adjustment unit 70 in each of the individual flow paths 65.

In the present embodiment, in step S210 of the deposition amount variation reduction process shown in FIG. 8, the control unit 500 acquires a state of a pressure of the plasticized material discharged from each of the nozzles 68A to 68D as the discharge state. More specifically, the control unit 500 acquires pressure values measured by the first measurement units 90. For example, when the number of discharge-on nozzles decreases, the pressure values measured by the first measurement units 90 disposed in the individual flow paths 65 communicating with the discharge-on nozzles increase, and when the number of discharge-on nozzles increases, the pressure values measured by the first measurement units 90 disposed in the individual flow paths 65 communicating with the discharge-on nozzles decrease.

In step S220, the control unit 500 controls the relative speed of the shaping unit 200 with respect to the stage 300 and the rotation speed of the flat screw 40 based on the pressure values measured by each of the first measurement units 90. In the present embodiment, the control unit 500 controls the relative speed of the shaping unit 200 with respect to the stage 300 and the rotation speed of the flat screw 40 by using a map or a function representing a relationship of the pressure values measured by the first measurement units 90, the relative speed of the shaping unit 200 with respect to the stage 300, and the rotation speed of the flat screw 40. The map and the function are created by tests performed in advance. When the pressure values measured by the first measurement units 90 increase, the control unit 500 increases the relative speed of the shaping unit 200 with respect to the stage 300. When the relative speed of the shaping unit 200 with respect to the stage 300 cannot be increased, the control unit 500 decreases the rotation speed of the flat screw 40. On the other hand, when the pressure values measured by the first measurement units 90 decrease, the control unit 500 decreases the relative speed of the shaping unit 200 with respect to the stage 300. When the relative speed of the shaping unit 200 with respect to the stage 300 cannot be decreased, the control unit 500 increases the rotation speed of the flat screw 40.

According to the three-dimensional shaping device 100b of the present embodiment described above, the control unit 500 uses the state of the pressure detected by each of the first measurement units 90 disposed in each of the individual flow paths 65A to 65D communicating with each of the nozzles 68A to 68D as the discharge state in the deposition amount variation reduction process. Therefore, even when the discharge amount from the discharge-on nozzle varies due to pressure variation in each of the individual flow paths 65A to 65D, it is possible to reduce the variation in the deposition amount per unit area of the plasticized material discharged from the discharge-on nozzle and deposited on the stage 300 or the existing layer. In particular, in the present embodiment, each of the first measurement units 90 is disposed on the upstream portion of the discharge amount adjustment unit 70 in each of the individual flow paths 65A to 65D. Therefore, the pressure in each of the individual flow paths 65A to 65D can be accurately measured by each of the first measurement units 90.

C. Third Embodiment

Figure 14:
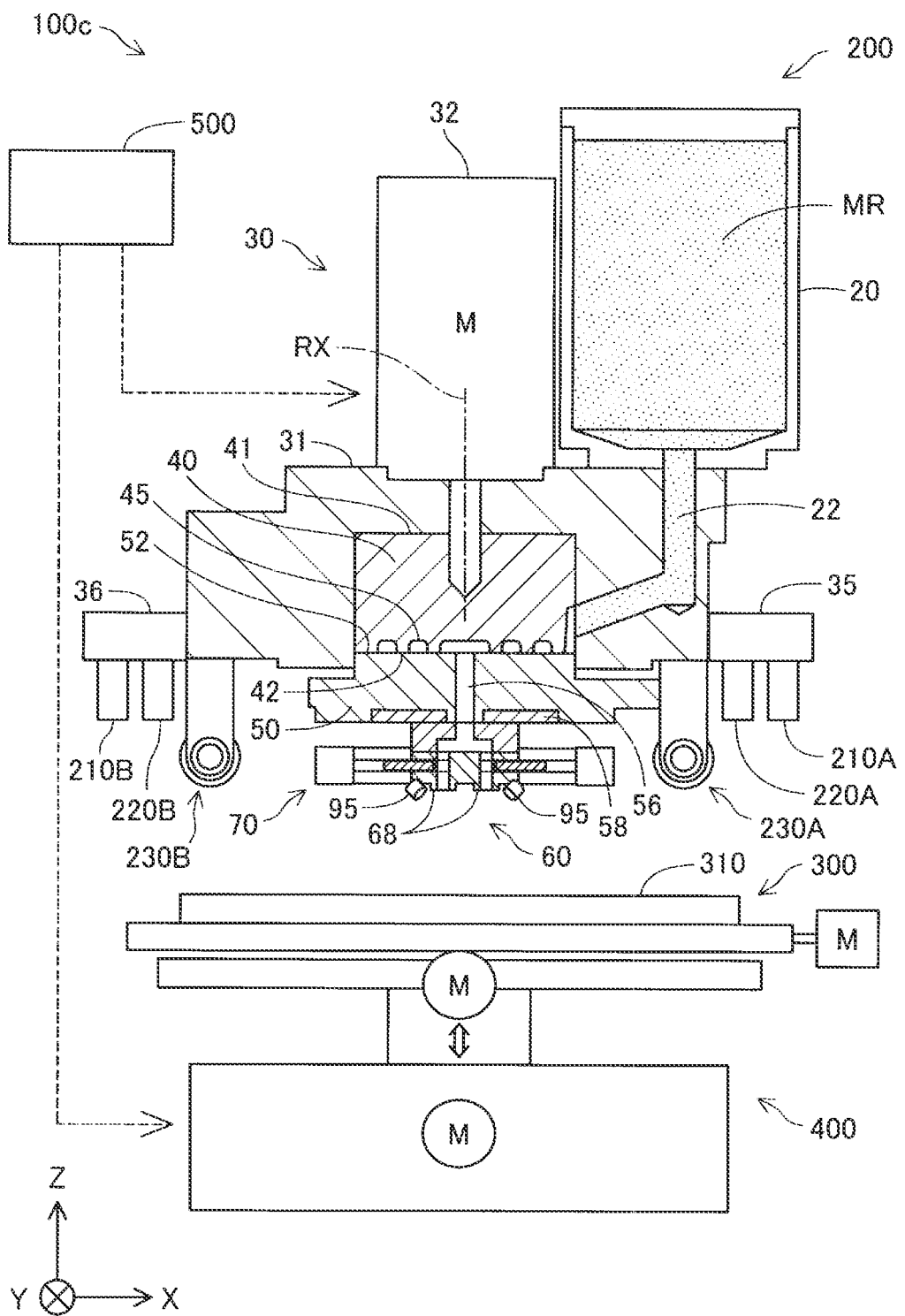
FIG. 14 is an illustrative diagram showing a schematic configuration of a second measurement unit of a three-dimensional shaping device according to a third embodiment.

FIG. 14 is a cross-sectional view showing a schematic configuration of a three-dimensional shaping device 100c according to a third embodiment. The three-dimensional shaping device 100c according to the third embodiment is different from the first embodiment in that second measurement units 95 are provided, and the control unit 500 acquires the discharge state by using the second measurement units 95 in the deposition amount variation reduction process. Other configurations are the same as those in the first embodiment unless otherwise specified.

In the present embodiment, the second measurement units 95 are disposed on the +X direction side with respect to the nozzles 68A to 68D and on the −X direction side with respect to the nozzles 68A to 68D, and are fixed to a lower end portion of the discharge unit 60. The second measurement units 95 measure a discharge amount or a line width of the plasticized material discharged from the nozzles 68A to 68D. The second measurement unit 95 may measure a discharge amount or a line width of the plasticized material before the plasticized material is discharged from each of the nozzles 68A to 68D and deposited on the stage 300 or the existing layer, or may measure a discharge amount or a line width of the plasticized material after the plasticized material is discharged from each of the nozzles 68A to 68D and deposited on the stage 300 or the existing layer. In the present embodiment, the second measurement unit 95 is constituted by a camera that images the plasticized material discharged from each of the nozzles 68A to 68D. The second measurement unit 95 may include a laser oscillating unit and a laser receiving unit, and may measure the discharge amount and the line width of the plasticized material by irradiating the plasticized material discharged from each of the nozzles 68A to 68D with a laser and receiving the irradiated laser.

In the present embodiment, in step S210 of the deposition amount variation reduction process shown in FIG. 8, the control unit 500 acquires a state of the discharge amount or a state of the line width of the plasticized material discharged from each of the nozzles 68A to 68D as the discharge state. More specifically, the control unit 500 acquires information related to the discharge amount or the line width measured by the second measurement units 95.

In step S220, the control unit 500 controls the relative speed of the shaping unit 200 with respect to the stage 300 and the rotation speed of the flat screw 40 based on the discharge amount or the line width measured by the second measurement units 95. For example, when the discharge amount or the line width measured by the second measurement units 95 increases, the control unit 500 increases the relative speed of the shaping unit 200 with respect to the stage 300. When the relative speed of the shaping unit 200 with respect to the stage 300 cannot be increased, the control unit 500 decreases the rotation speed of the flat screw 40. When the discharge amount or the line width measured by the second measurement units 95 decreases, the control unit 500 decreases the relative speed of the shaping unit 200 with respect to the stage 300. When the relative speed of the shaping unit 200 with respect to the stage 300 cannot be decreased, the control unit 500 increases the rotation speed of the flat screw 40.

According to the three-dimensional shaping device 100c of the present embodiment described above, in the deposition amount variation reduction process, the control unit 500 uses the state of the discharge amount or the line width of the plasticized material from each of the nozzles 68A to 68D measured by the second measurement units 95 as the discharge state, and thus, even when the discharge amount or the line width of the plasticized material discharged from the discharge-on nozzle varies, it is possible to prevent the variation in the deposition amount per unit area of the plasticized material discharged from the discharge-on nozzle and deposited on the stage 300 or the existing layer.

D: Fourth Embodiment

Figure 15:
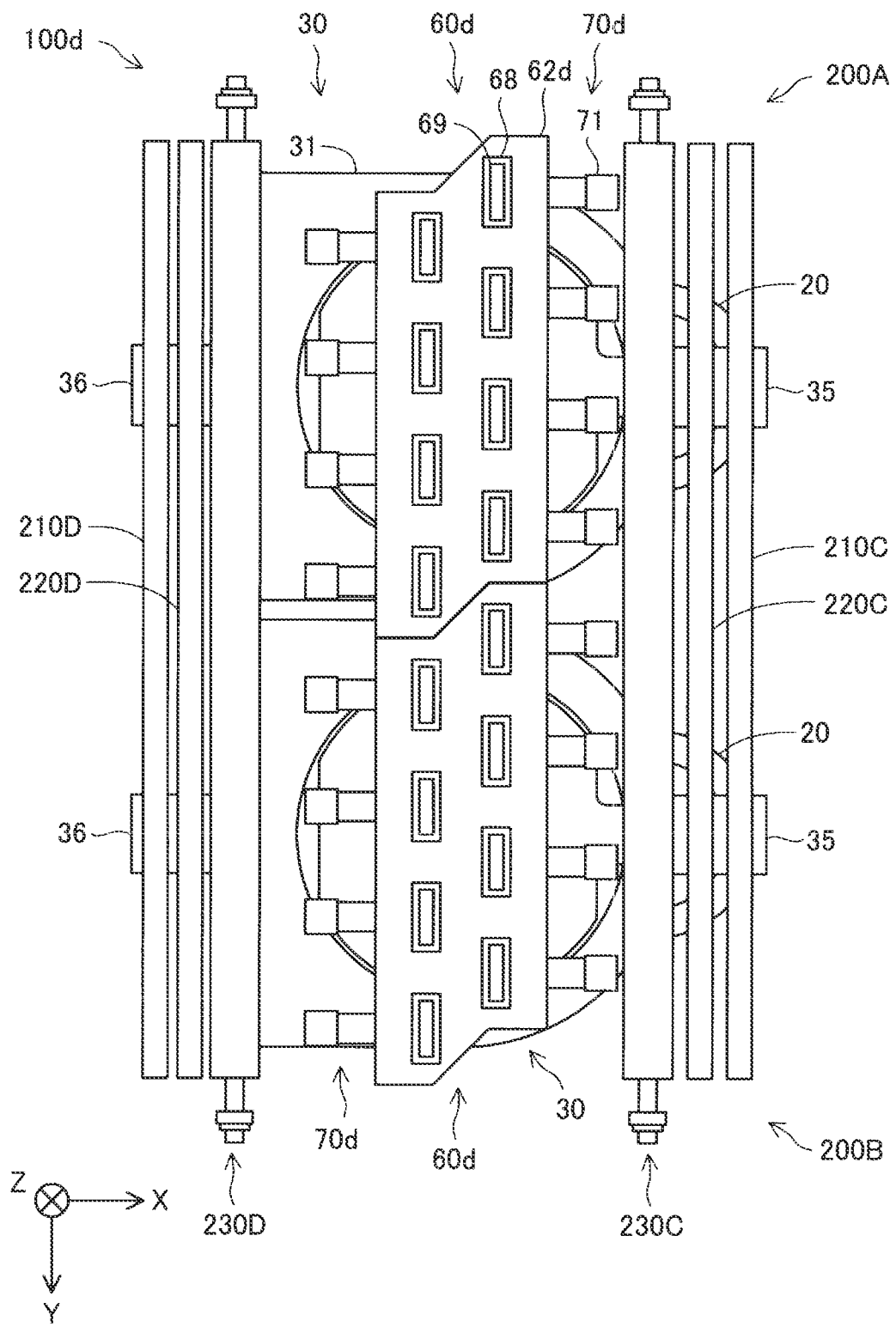
FIG. 15 is a bottom view showing a schematic configuration of a shaping unit of a three-dimensional shaping device according to a fourth embodiment.

FIG. 15 is a bottom view showing a schematic configuration of two shaping units 200A, 200B of a three-dimensional shaping device 100d according to a fourth embodiment. The three-dimensional shaping device 100d according to the fourth embodiment is different from that of the first embodiment in that two shaping units 200A, 200B are provided and content of the deposition amount variation reduction process is different. Other configurations are the same as those in the first embodiment unless otherwise specified.

The two shaping units 200A, 200B are disposed side by side along the Y direction. In the following description, the shaping unit 200A disposed on the −Y direction side is referred to as a first shaping unit 200A, and the shaping unit 200B disposed on the +Y direction side is referred to as a second shaping unit 200B. The first shaping unit 200A includes the material supply units 20, the plasticizing units 30, discharge units 60d, and discharge amount adjustment units 70d. The configuration of the material supply unit 20 and the configuration of the plasticizing unit 30 are the same as those of the first embodiment. In the present embodiment, the discharge unit 60d includes eight nozzles 68 disposed side by side along the Y direction. The discharge amount adjustment unit 70d is constituted by eight valves 71. The configuration of the second shaping unit 200B is the same as the configuration of the first shaping unit 200A.

In the present embodiment, one first surface activation unit 210C, one second surface activation unit 210D, one first heating and cooling unit 220C, one second heating and cooling unit 220D, one first flattening unit 230C, and one second flattening unit 230D are provided. Each of the surface activation units 210C, 210D is longer in the Y direction than each of the surface activation units 210A, 210B of the first embodiment. Each of the heating and cooling units 220C, 220D is longer in the Y direction than each of the heating and cooling units 220A, 220B of the first embodiment. Each of the flattening units 230C, 230D is longer in the Y direction than each of the flattening units 230A, 230B of the first embodiment. The first surface activation unit 210C and the first heating and cooling unit 220C are fixed to the first support portion 35 of the first shaping unit 200A and the first support portion of the second shaping unit 200B. The second surface activation unit 210D and the second heating and cooling unit 220D are fixed to the second support portion 36 of the first shaping unit 200A and the second support portion 36 of the second shaping unit 200B. The first flattening unit 230C and the second flattening unit 230D are fixed to the lower end portion of the screw case 31 of the first shaping unit 200A and the lower end portion of the screw case 31 of the second shaping unit 200B.

The moving unit 400 relatively moves the first shaping unit 200A and the second shaping unit 200B with respect to the stage 300. In the present embodiment, the moving unit 400 relatively moves the first shaping unit 200A and the second shaping unit 200B as a whole with respect to the stage 300. That is, the moving unit 400 does not relatively move the second shaping unit 200B with respect to the first shaping unit 200A.

In the present embodiment, in step S210 of the deposition amount variation reduction process shown in FIG. 8, the control unit 500 acquires a ratio of the discharge-on nozzles to the eight nozzles 68 of the first shaping unit 200A, and acquires a ratio of the discharge-on nozzles to the eight nozzles 68 of the second shaping unit 200B. In step S220, when the ratio of the discharge-on nozzles of the first shaping unit 200A and the ratio of the discharge-on nozzles of the second shaping unit 200B are different from each other, the control unit 500 adjusts the relative speeds of the first shaping unit 200A and the second shaping unit 200B with respect to the stage 300 such that the deposition amount per unit area of the plasticized material that is discharged from the discharge-on nozzle having a larger ratio of the discharge-on nozzles among the first shaping unit 200A and the second shaping unit 200B and deposited on the stage 300 or the existing layer is the same before and after a change in the number of discharge-on nozzles, and adjusts the rotation speed of the flat screw 40 having a smaller ratio of the discharge-on nozzles among the first shaping unit 200A and the second shaping unit 200B such that the deposition amount per unit area of the plasticized material that is discharged from the discharge-on nozzle having a smaller ratio of the discharge-on nozzles among the first shaping unit 200A and the second shaping unit 200B and deposited on the stage 300 or the existing layer is the same before and after the change in the number of discharge-on nozzles. For example, when the number of discharge-on nozzles of the first shaping unit 200A is changed from eight to six and the number of discharge-on nozzles of the second shaping unit 200B is changed from eight to seven, the control unit 500 increases the relative speed of the first shaping unit 200A and the second shaping unit 200B with respect to the stage 300 such that the deposition amount per unit area of the plasticized material that is discharged from the discharge-on nozzle of the second shaping unit 200B having a larger ratio of the discharge-on nozzles among the first shaping unit 200A and the second shaping unit 200B and deposited on the stage 300 or the existing layer is the same before and after a change in the number of discharge-on nozzles, and decreases the rotation speed of the flat screw 40 of the first shaping unit 200A such that the deposition amount per unit area of the plasticized material that is discharged from the discharge-on nozzle of the first shaping unit 200A having a smaller ratio of the discharge-on nozzles and deposited on the stage 300 or the existing layer is the same before and after the change in the number of discharge-on nozzles.

According to the three-dimensional shaping device 100d of the present embodiment described above, in the configuration in which the two shaping units 200A, 200B integrally relatively move with respect to the stage 300, even when the ratio of the discharge-on nozzles of the first shaping unit 200A and the ratio of the discharge-on nozzles of the second shaping unit 200B are different from each other due to a change in the number of discharge-on nozzles of each of the shaping units 200A, 200B, the deposition amount per unit area of the plasticized material that is discharged from the discharge-on nozzle of each of the shaping units 200A, 200B and deposited on the stage 300 or the existing layer can be prevented from varying before and after the change in the number of discharge-on nozzles.

E. Other Embodiments (E1) In the three-dimensional shaping devices 100 to 100d of the above-described embodiments, the control unit 500 adjusts the relative speed of the shaping unit 200 with respect to the stage 300 and the rotation speed of the flat screw 40 based on the discharge state of the plasticized material from each nozzle 68 in the deposition amount variation reduction process shown in FIG. 8. Meanwhile, the control unit 500 may adjust the relative speed of the shaping unit 200 with respect to the stage 300, the rotation speed of the flat screw 40, and an adjustment degree of the discharge amount by the discharge amount adjustment unit 70 based on the discharge state of the plasticized material from each nozzle 68. In this case, it is preferable that each valve 71 of the discharge amount adjustment unit 70 is configured to be capable of not only switching the on/off of the discharge of the plasticized material from each nozzle 68 but also adjusting the discharge amount of the plasticized material from each nozzle 68.

(E2) In the deposition amount variation reduction process shown in FIG. 8, the control unit 500 may adjust the adjustment degree of the discharge amount by the discharge amount adjustment unit 70 according to the discharge state of the plasticized material from each nozzle 68 without adjusting the relative speed of the shaping unit 200 with respect to the stage 300 and the rotation speed of the flat screw 40.

(E3) In the deposition amount variation reduction process shown in FIG. 8, the control unit 500 may adjust the relative speed of the shaping unit 200 with respect to the stage 300 and the adjustment degree of the discharge amount by the discharge amount adjustment unit 70 according to the discharge state of the plasticized material from each nozzle 68 without adjusting the rotation speed of the flat screw 40.

(E4) In the deposition amount variation reduction process shown in FIG. 8, the control unit 500 may adjust the rotation speed of the flat screw 40 and the adjustment degree by the discharge amount adjustment unit 70 according to the discharge state of the plasticized material from each nozzle 68 without adjusting the relative speed of the shaping unit 200 with respect to the stage 300.

(E5) In the deposition amount variation reduction process shown in FIG. 8, the control unit 500 may adjust the relative speed of the shaping unit 200 with respect to the stage 300 according to the discharge state of the plasticized material from each nozzle 68 without adjusting the rotation speed of the flat screw 40.

(E6) In the deposition amount variation reduction process shown in FIG. 8, the control unit 500 may adjust the rotation speed of the flat screw 40 according to the discharge state of the plasticized material from each nozzle 68 without adjusting the relative speed of the shaping unit 200 with respect to the stage 300.

(E7) In the three-dimensional shaping devices 100 to 100*d* according to the above-described embodiments, the plasticizing unit 30 includes the flat screw 40 and the barrel 50, and plasticizes the material by using the relative rotation between the flat screw 40 and the barrel 50 to generate the plasticized material. Meanwhile, the plasticizing unit 30 may include, instead of the flat screw 40, a screw having an elongated columnar outer shape, in which a spiral groove is formed in a side surface portion of a column, and a cylindrical barrel surrounding the screw, and may plasticize the material using a relative rotation between the screw and the barrel to generate the plasticized material. The plasticizing unit 30 may not include the flat screw 40 or the screw described above. In this case, for example, as in a three-dimensional shaping device of a fused deposition modeling (FDM) type, a filament of the material may be heated by a heater to be plasticized, so as to generate the plasticized material.

(E8) In the three-dimensional shaping devices 100 to 100*d* of the above-described embodiments, the control unit 500 causes the shaping unit 200 to relatively move in the +X direction with respect to the stage 300 and to discharge the plasticized material from each nozzle 68 to form the odd-numbered layer of the three-dimensional shaped object, and causes the shaping unit 200 to relatively move in the −X direction with respect to the stage 300 and to discharge the plasticized material from each nozzle 68 to form the even-numbered layer. Meanwhile, the control unit 500 may form the odd-numbered layer by discharging the plasticized material from each nozzle 68 while relatively moving the shaping unit 200 in the +X direction with respect to the stage 300, return the shaping unit 200 with respect to the stage 300 to a position before forming the odd-numbered layer, and then form the even-numbered layer by discharging the plasticized material from each nozzle 68 while relatively moving the shaping unit 200 in the +X direction with respect to the stage 300. In addition, for example, the control unit 500 may form the shaping layer by discharging the plasticized material from each nozzle 68 while relatively moving the shaping unit 200 in the +X direction relative to the stage 300, then moving the shaping unit 200 in the +Y direction or the −Y direction relative to the stage 300, and further discharging the plasticized material from each nozzle 68 while relatively moving the shaping unit 200 in the −X direction relative to the stage 300.

(E9) The three-dimensional shaping devices 100 to 100*d* of the above-described embodiments include the first surface activation unit 210A, the second surface activation unit 210B, the first heating and cooling unit 220A, the second heating and cooling unit 220B, the first flattening unit 230A, and the second flattening unit 230B. Meanwhile, the three-dimensional shaping devices 100 to 100*d* may not include the first surface activation unit 210A, the second surface activation unit 210B, the first heating and cooling unit 220A, the second heating and cooling unit 220B, the first flattening unit 230A, and the second flattening unit 230B.

(E10) In the three-dimensional shaping devices 100 to 100*d* of the above-described embodiments, the ABS resin in a pellet shape is used as the material MR, but as the material MR used in the shaping unit 200, for example, a material for shaping a three-dimensional shaped object by using various materials such as the thermoplastic material, a metal material, and a ceramic material as main materials may be adopted. Here, the "main material" refers to a material serving as a center component for forming a shape of a three-dimensional shaped object, and refers to a material having a content of 50 wt % or more in the three-dimensional shaped object. The above plasticized material includes a material obtained by melting the main material alone or a material obtained by melting the main material and a part of components contained in the main material into a paste form.

When the thermoplastic material is used as the main material, the plasticized material is generated by plasticizing the material in the plasticizing unit 30. A term "plasticize" means that heat is applied to a thermoplastic material to melt the material. The term "melt" means that the thermoplastic material is softened by being heated to a temperature equal to or higher than the glass transition point and exhibits fluidity.

As the thermoplastic material, for example, any one of the following thermoplastic resin materials or a combination of two or more thereof can be used.

Examples of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone Additives such as a wax, a flame retardant, an antioxidant, and a heat stabilizer may be mixed into the thermoplastic material in addition to a pigment, a metal, a ceramic. In the plasticizing unit 30, the thermoplastic material is converted into a melted state by being plasticized by the rotation of the flat screw 40 and the heating of the heater 58. After the plasticized material generated in such a manner is discharged from the nozzles 68, the plasticized material is cured due to a reduction in temperature.

It is desirable that the thermoplastic material is discharged from the nozzles 68 in a state in which the material is heated to a temperature equal to or higher than the glass transition point thereof and is melted completely. The "completely melted state" refers to a state in which no unmelted thermoplastic material is present, and refers to a state in which no solid object in a pellet shape remains when, for example, a thermoplastic resin in a pellet shape is used in a material.

In the shaping unit 200, for example, the following metal material may be used as the main material instead of the above-described thermoplastic material. In this case, it is desirable that a component to be melted at the time of generating the plasticized material is mixed with a powder material obtained by converting the following metal material into a powder, and then the mixture is put into the plasticizing unit 30.

Examples of Metal Material

Single metals such as magnesium (Mg), iron (Fe), cobalt (Co), chromium (Cr), aluminum (Al), titanium (Ti), copper (Cu), and nickel (Ni), or an alloy containing one or more of these metals Examples of Alloy Maraging steel, stainless steel, cobalt chrome molybdenum, a titanium alloy, a nickel alloy, an aluminum alloy, cobalt alloy, and a cobalt chromium alloy In the shaping unit 200, a ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the plasticized material disposed on the stage 300 may be cured by, for example, sintering with laser irradiation or warm air.

A powder material of the metal material or the ceramic material to be put into the material supply unit 20 may be a mixed material obtained by mixing a plurality of types of powders of a single metal or an alloy with powders of a ceramic material. The powder material of the metal material or the ceramic material may be coated with, for example, a thermoplastic resin shown in the above-described example, or a thermoplastic resin other than those in the above-described example. In this case, the thermoplastic resin may be melted to exhibit fluidity in the plasticizing unit 30.

For example, the following solvents may be added to the powder material of the metal material or the ceramic material to be put into the material supply unit 20 as the material MR. One solvent or a combination of two or more solvents selected from the following solvents may be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, isopropyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (such as tetrabutylammonium acetate); and ionic liquids such as butyl carbitol acetate In addition, for example, the following binders may be added to the powder material of the metal material or the ceramic material to be put into the material supply unit 20.

Examples of Binder

An acrylic resin, an epoxy resin, a silicone resin, a cellulose-based resin or other synthetic resins, and a polylactic acid (PLA), polyamide (PA), polyphenylene sulfide (PPS), polyether ether ketone (PEEK) or other thermoplastic resins F. Other Aspects The present disclosure is not limited to the embodiments described above, and can be implemented in various forms without departing from the scope of the present disclosure. For example, the present disclosure can be implemented in the following forms. In order to solve a part of or all of problems of the present disclosure, or to achieve a part of or all of effects of the present disclosure, technical features in the above-described embodiments corresponding to technical features described below can be replaced or combined as appropriate. Technical features can be deleted as appropriate unless the technique features are described as essential in the present specification.

(1) According to a first aspect of the present disclosure, a three-dimensional shaping device is provided. The three-dimensional shaping device includes: a plasticizing unit including a screw and configured to plasticize a material by rotation of the screw to generate a plasticized material; a stage having a deposition surface on which the plasticized material is deposited; a discharge unit having a plurality of nozzles disposed side by side along a first axis parallel to the deposition surface of the stage, and configured to discharge the plasticized material from the plurality of nozzles toward the deposition surface; a discharge amount adjustment unit configured to adjust a discharge amount of the plasticized material from each of the plurality of nozzles; a moving unit configured to relatively move the discharge unit with respect to the stage along a second axis that is parallel to the deposition surface of the stage and intersects the first axis; and a control unit. The control unit executes, based on a discharge state of the plasticized material from the plurality of nozzles, at least one of a first control of controlling a rotation speed of the screw, a second control of controlling the discharge amount by the discharge amount adjustment unit, and a third control of controlling a relative speed of the discharge unit with respect to the stage, so as to laminate a shaping layer formed of the plasticized material on the stage.

According to the three-dimensional shaping device of this aspect, the control unit controls at least one of the rotation speed of the screw, the discharge amount adjusted by the discharge amount adjustment unit, and the relative speed of the discharge unit with respect to the stage based on the discharge state of the plasticized material from each nozzle, and thus it is possible to prevent a variation in a deposition amount per unit area of the plasticized material discharged from each nozzle and deposited on the stage. Therefore, the three-dimensional shaped object can be shaped with high dimensional accuracy.

(2) In the three-dimensional shaping device according to the above aspect, the control unit may execute at least one of the first control, the second control, and the third control based on a state indicating a stop and a start of discharge of the plasticized material from each of the plurality of nozzles as the discharge state.

According to the three-dimensional shaping device of this aspect, it is possible to prevent the variation in the deposition amount per unit area of the plasticized material discharged from each nozzle and deposited on the stage with simple control.

(3) In the three-dimensional shaping device according to the above aspect, when increasing the number of nozzles that stop discharging the plasticized material among the plurality of nozzles, the control unit may decrease the rotation speed of the screw in the case of executing the first control, may decrease the discharge amount by the discharge amount adjustment unit in the case of executing the second control, and may increase the relative speed of the discharge unit with respect to the stage in the case of executing the third control.

According to the three-dimensional shaping device of this aspect, when increasing the number of nozzles that stop discharging the plasticized material, the control unit executes at least one of reduction of the rotation speed of the screw, reduction of the discharge amount by the discharge amount adjustment unit, and increase of the relative speed of the discharge unit with respect to the stage, and thus it is possible to reliably prevent the variation in the deposition amount per unit area of the plasticized material discharged from each nozzle and deposited on the stage.

(4) In the three-dimensional shaping device according to the aspect described above, the discharge unit may include a plurality of individual flow paths respectively communicating with the plurality of nozzles, and a plurality of first measurement units configured to respectively measure pressures of the plurality of individual flow paths, and the control unit may execute at least one of the first control, the second control, and the third control based on a state indicating the pressures measured by the plurality of first measurement units as the discharge state.

According to the three-dimensional shaping device of this aspect, even when the discharge amount from each nozzle varies due to a pressure variation in each individual flow path, the control unit can adjust at least one of the rotation speed of the screw, the discharge amount adjusted by the discharge amount adjustment unit, and the relative speed of the discharge unit with respect to the stage based on the pressure in each individual flow path measured by each first measurement unit, and thus it is possible to prevent the variation in the deposition amount per unit area of the plasticized material discharged from each nozzle and deposited on the stage.

(5) In the three-dimensional shaping device according to the aspect described above, the plurality of first measurement units may be disposed at upstream positions of the discharge amount adjustment unit in the plurality of individual flow paths.

According to the three-dimensional shaping device of this aspect, the pressure in each individual flow path can be accurately measured by each first measurement unit.

(6) The three-dimensional shaping device according to the aspect described above may further include a second measurement unit configured to measure the discharge amount or a line width of the plasticized material discharged from each of the plurality of nozzles, and the control unit may execute at least one of the first control, the second control, and the third control based on a state indicating the discharge amount or the line width measured by the second measurement unit as the discharge state.

According to the three-dimensional shaping device of this aspect, even when the discharge amount or the line width of the plasticized material from each nozzle varies, the control unit can adjust at least one of the rotation speed of the screw, the discharge amount adjusted by the discharge amount adjustment unit, and the relative speed of the discharge unit with respect to the stage based on a state of the discharge amount or the line width measured by the second measurement unit, and thus it is possible to prevent the variation in the deposition amount per unit area of the plasticized material discharged from each nozzle and deposited on the stage.

(7) In the three-dimensional shaping device according to the aspect described above, the plasticizing unit may include a flat screw having a groove forming surface provided with a groove portion as the screw, and a barrel facing the groove forming surface and having a communication hole communicating with the plurality of nozzles, and the plasticizing unit may plasticize the material supplied to the groove portion by rotation of the flat screw to generate the plasticized material, and supply the plasticized material from the communication hole to the plurality of nozzles.

According to the three-dimensional shaping device of this aspect, since the plasticized material can be generated by plasticizing the material supplied to the groove portion by the rotation of the flat screw, it is possible to reduce a size of the plasticizing unit in a direction along a rotation axis of the flat screw.

(8) In the three-dimensional shaping device according to the aspect described above, the discharge amount adjustment unit may include a plurality of valves respectively corresponding to the plurality of nozzles, and the control unit may control opening degrees of the plurality of valves so as to adjust the discharge amount of the plasticized material from each of the plurality of nozzles.

According to the three-dimensional shaping device of this aspect, the discharge amount of the plasticized material from each nozzle can be adjusted with a simple configuration.

(9) According to a second aspect of the present disclosure, a method for manufacturing a three-dimensional shaped object is provided. The method for manufacturing a three-dimensional shaped object is a method of discharging a plasticized material from a plurality of nozzles disposed side by side along a first axis toward a deposition surface parallel to the first axis, and laminating a shaping layer formed of the plasticized material on the deposition surface to manufacture a three-dimensional shaped object. The method includes: a first step of plasticizing a material by rotation of a screw to generate the plasticized material; a second step of adjusting a discharge amount of the plasticized material from each of the plurality of nozzles; and a third step of discharging the plasticized material from the plurality of nozzles toward the deposition surface while relatively moving the plurality of nozzles with respect to the deposition surface along a second axis parallel to the deposition surface and intersecting the first axis. At least one of the rotation speed of the screw in the first step, the discharge amount in the second step, and the relative speed of the plurality of nozzles with respect to the deposition surface in the third step is adjusted based on a discharge state of the plasticized material from the plurality of nozzles, and a shaping layer formed of the plasticized material is laminated on the deposition surface.

According to the method for manufacturing a three-dimensional shaped object of this aspect, at least one of the rotation speed of the screw, the discharge amount adjusted by the discharge amount adjustment unit, and the relative speed of the discharge unit with respect to the deposition surface is adjusted based on the discharge state of the plasticized material from each nozzle, and thus it is possible to prevent the variation in the deposition amount per unit area of the plasticized material discharged from each nozzle and deposited on the deposition surface. Therefore, the three-dimensional shaped object can be shaped with high dimensional accuracy.

The present disclosure can be implemented in various aspects other than the three-dimensional shaping device. For example, the present disclosure can be implemented in aspects such as a method for controlling a three-dimensional shaping device and a method for shaping a three-dimensional shaped object.

What is claimed is:

1. A three-dimensional shaping device comprising: a plasticizing unit including a screw and configured to plasticize a material by rotation of the screw to generate a plasticized material; a stage having a deposition surface on which the plasticized material is deposited; a discharge unit having a plurality of nozzles, the plurality of nozzles communicating with the plasticizing unit through a flow channel, the plurality of nozzles being disposed side by side along a first axis parallel to the deposition surface of the stage, the discharge unit being configured to discharge the plasticized material from the plurality of nozzles toward the deposition surface; a discharge amount adjustment unit configured to adjust a discharge amount of the plasticized material from each of the plurality of nozzles; a moving unit configured to relatively move the discharge unit with respect to the stage along a second axis that is parallel to the deposition surface of the stage and intersects the first axis; a flattening unit configured to press the plasticized material deposited on the stage; a surface activation unit, wherein the surface activation unit is respectively disposed on both sides of the plurality of nozzles in the second axis and configured to increase wettability of the shaping layer; a heating and cooling unit, wherein the heating and cooling unit is respectively disposed on both sides of the plurality of nozzles in the second axis and configured to heat an upper surface of the shaping layer formed on the stage and cool the shaping layer formed on the stage; the flattening unit, the heating and cooling unit, and the surface activation unit are arranged in this order along the second axis in a direction away from the nozzle; a memory configured to store a program; and a processor configured to execute the program so as to: detect a discharge-on state or a discharge-off state with respect to each of the plurality of nozzles, wherein the plasticized material is discharged from a nozzle of the plurality of nozzles in the discharge-on state, and discharge of the plasticized material is stopped from a nozzle of the plurality of nozzles in the discharge-off state; perform, based on a discharge state of the plasticized material from the plurality of nozzles, at least one of a first control of controlling a rotation speed of the screw, a second control of controlling the discharge amount by the discharge amount adjustment unit, and a third control of controlling a relative speed of the discharge unit with respect to the stage, so as to laminate a shaping layer formed of the plasticized material on the stage; cause the moving unit to relatively move the discharge unit with respect to the stage at a first speed and cause the plasticizing unit to rotate the screw at a first rotation speed when the processor detects that a first number of the plurality of nozzles is in the discharge-on state; and perform one of: causing the moving unit to relatively move the discharge unit with respect to the stage at a second speed and causing the plasticizing unit to rotate the screw at the first rotation speed when the processor detects that a second number of the plurality of nozzles is in the discharge-on state; or causing the moving unit to relatively move the discharge unit with respect to the stage at the first speed and causing the plasticizing unit to rotate the screw at a second rotation speed when the processor detects that the second number of the plurality of nozzles is in the discharge-on state, wherein the second number is smaller than the first number, the second speed is higher than the first speed, and the second rotation speed is slower than the first rotation speed.

2. The three-dimensional shaping device according to claim 1, wherein
the processor is configured to perform at least one of the first control, the second control, and the third control based on a state indicating a stop and a start of the discharge of the plasticized material from each of the plurality of nozzles as the discharge state.

3. The three-dimensional shaping device according to claim 2, wherein
the processor is further configured to control a number of nozzles among the plurality of nozzles to stop discharging the plasticized material,
when the processor is configured to increase the number of nozzles that stop discharging the plasticized material among the plurality of nozzles, the processor is configured to:
decrease the rotation speed of the screw when executing the first control;
decrease the discharge amount by the discharge amount adjustment unit when executing the second control; and
increase the relative speed of the discharge unit with respect to the stage when executing the third control.

4. The three-dimensional shaping device according to claim 1, wherein
the discharge unit includes a plurality of individual flow paths respectively communicating with the plurality of nozzles, and a plurality of first measurement units configured to respectively measure pressures of the plurality of individual flow paths, and
the processor is configured to perform at least one of the first control, the second control, and the third control based on a state indicating the pressures measured by the plurality of first measurement units as the discharge state.

5. The three-dimensional shaping device according to claim 4, wherein the plurality of first measurement units are disposed at upstream positions of the discharge amount adjustment unit in the plurality of individual flow paths.

6. The three-dimensional shaping device according to claim 1, further comprising:
   a second measurement unit configured to measure the discharge amount or a line width of the plasticized material discharged from each of the plurality of nozzles, wherein
   the processor is configured to perform at least one of the first control, the second control, and the third control based on a state indicating the discharge amount or the line width measured by the second measurement unit as the discharge state.

7. The three-dimensional shaping device according to claim 1, wherein
   the plasticizing unit includes
      a flat screw having a groove forming surface provided with a groove portion as the screw, and
      a barrel facing the groove forming surface and having a communication hole communicating with the plurality of nozzles, and
   the plasticizing unit plasticizes the material supplied to the groove portion by rotation of the flat screw to generate the plasticized material, and supplies the plasticized material from the communication hole to the plurality of nozzles.

8. The three-dimensional shaping device according to claim 1, wherein
   the discharge amount adjustment unit includes a plurality of valves respectively corresponding to the plurality of nozzles, and
   the processor is further configured to control opening degrees of the plurality of valves so as to adjust the discharge amount of the plasticized material from each of the plurality of nozzles.

9. The three-dimensional shaping device according to claim 2, wherein
   the discharge amount adjustment unit includes a plurality of valves respectively corresponding to the plurality of nozzles, and
   the processor is further configured to:
      cause the discharge amount adjustment unit to perform a valve open operation or a valve close operation with respect to the plurality of valves to adjust the discharge amount of the plasticized material from the plurality of nozzles;
      store, in the memory, the discharge-on state of a corresponding number of a nozzle or nozzles of the plurality of nozzles corresponding to the plurality of valves during the valve open operation when the processor causes the discharge amount adjustment unit to perform the valve open operation;
      store, in the memory, the discharge-off state of a corresponding number of a nozzle or nozzles of the plurality of nozzles corresponding to the plurality of valves during the valve close operation when the processor causes the discharge amount adjustment unit to perform the valve close operation; and
      acquire the state indicating the stop and the start of the discharge of the plasticized material from each of the plurality of nozzles from the memory.

10. The three-dimensional shaping device according to claim 2, wherein
   the discharge amount adjustment unit includes a plurality of valves respectively corresponding to the plurality of nozzles,
   the three-dimensional shaping device further comprises an encoder configured to detect a position of each of the plurality of valves in the discharge amount adjustment unit, and
   the processor is configured to acquire the state indicating the stop and the start of the discharge of the plasticized material from each of the plurality of nozzles by using the position detected by the encoder.

11. The three-dimensional shaping device according to claim 1, wherein the heating and cooling unit and cooling unit includes a blower, and the blower is configured to blow hot air heated by a built-in heater and cold air.

12. The three-dimensional shaping device according to claim 1, wherein
   one nozzle in the discharge-on state of the second number of the plurality of nozzles is directly adjacent to:
      another nozzle in the discharge-on state of the second number of the plurality of nozzles; and
      two nozzles in the discharge-off state of the plurality of nozzles.

* * * * *